Jan. 16, 1962 A. O. FITZNER 3,016,778
CONTROLS FOR MACHINE TOOLS AND THE LIKE
Filed Sept. 24, 1958 13 Sheets-Sheet 1

INVENTOR
ARTHUR O. FITZNER
by: Carlson, Pitzner, Hubbard & Wolfe
ATTYS.

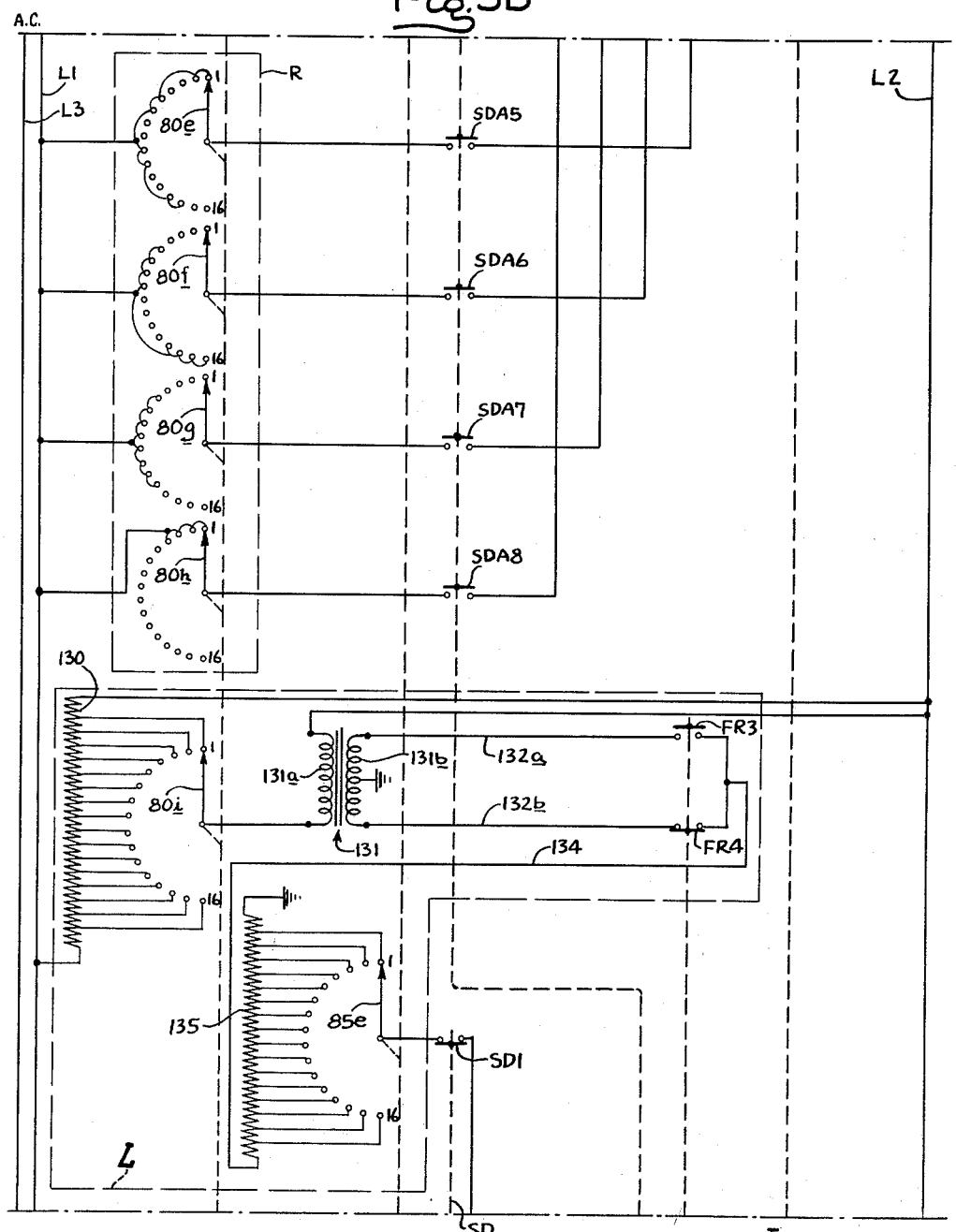

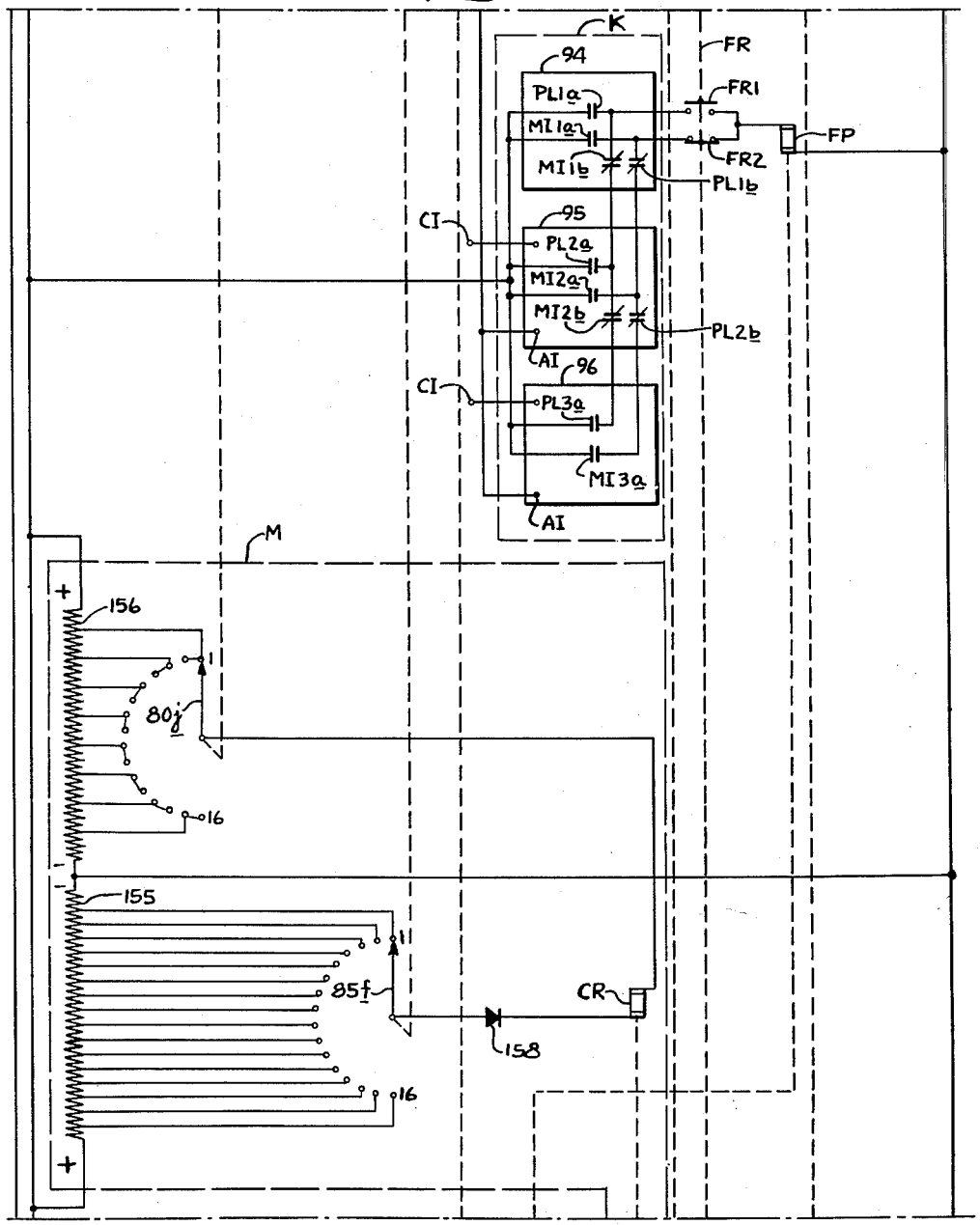

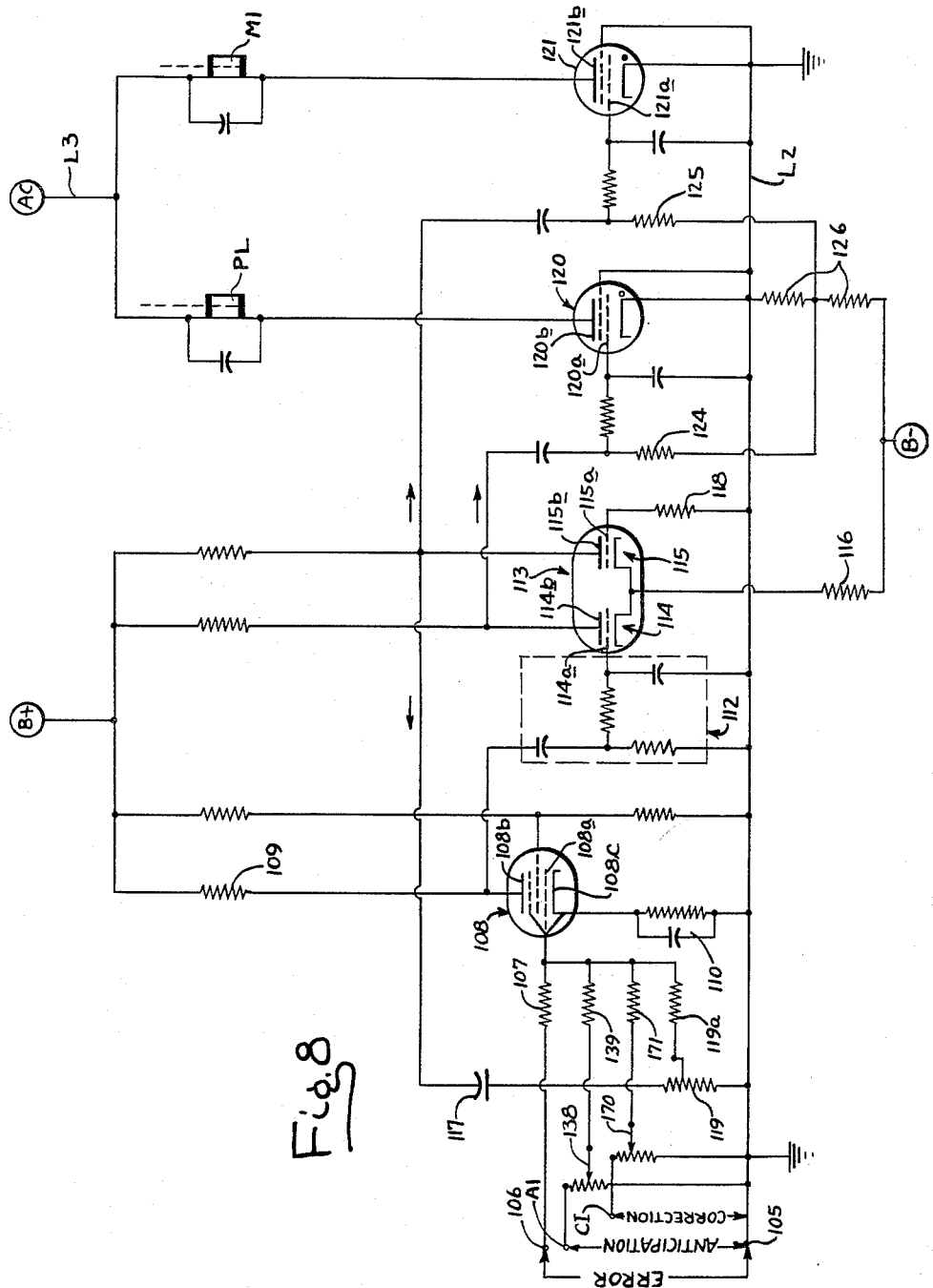

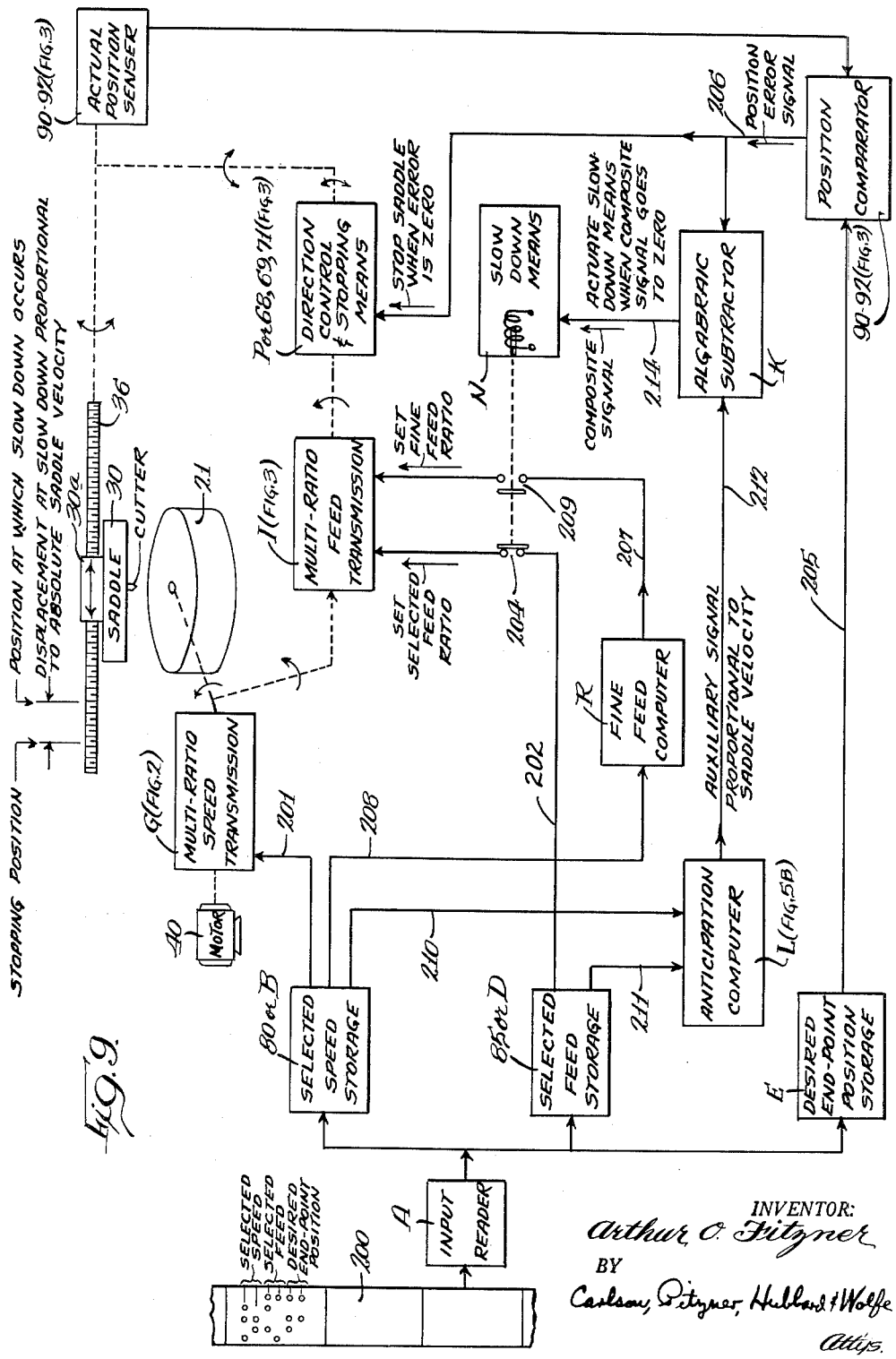

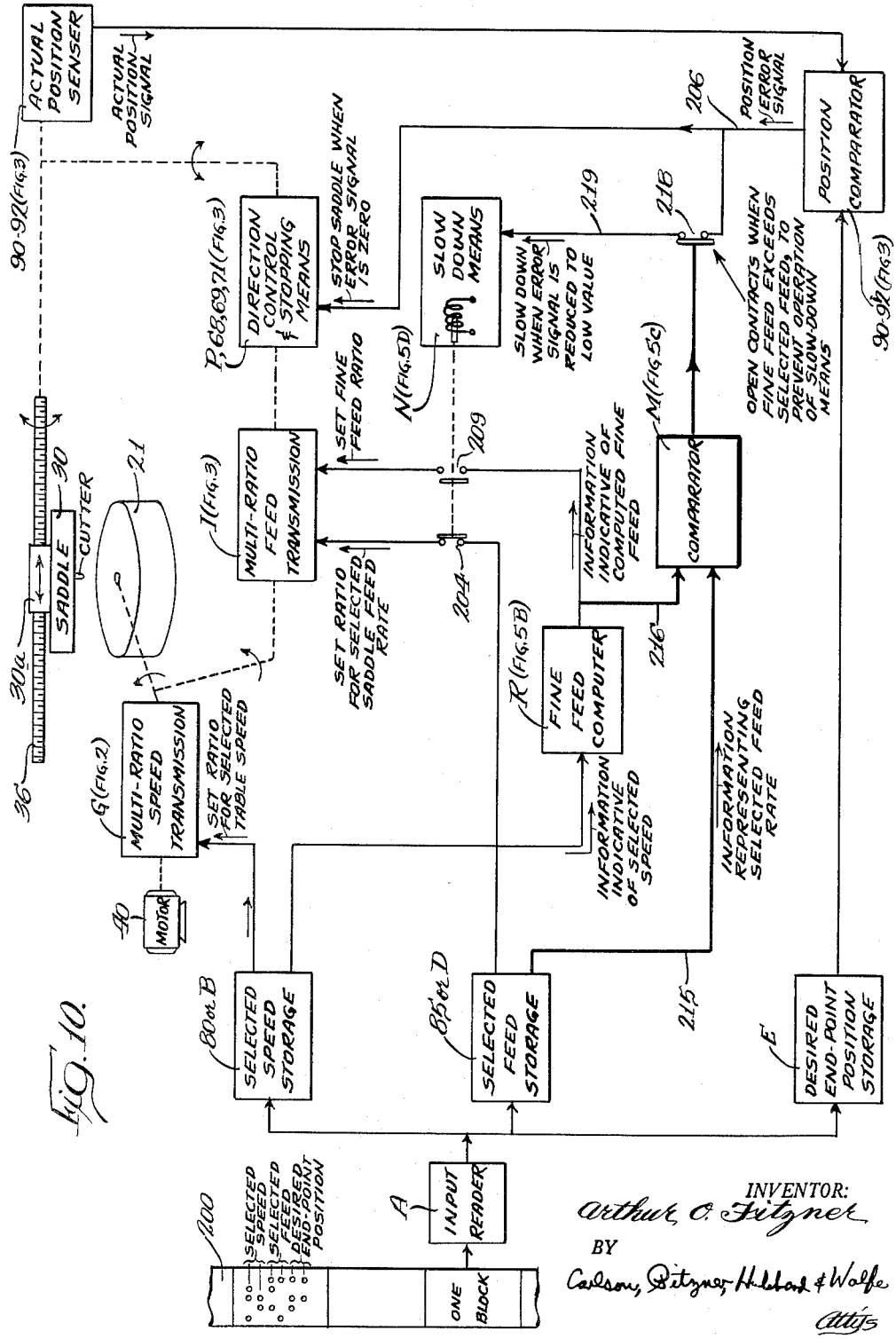

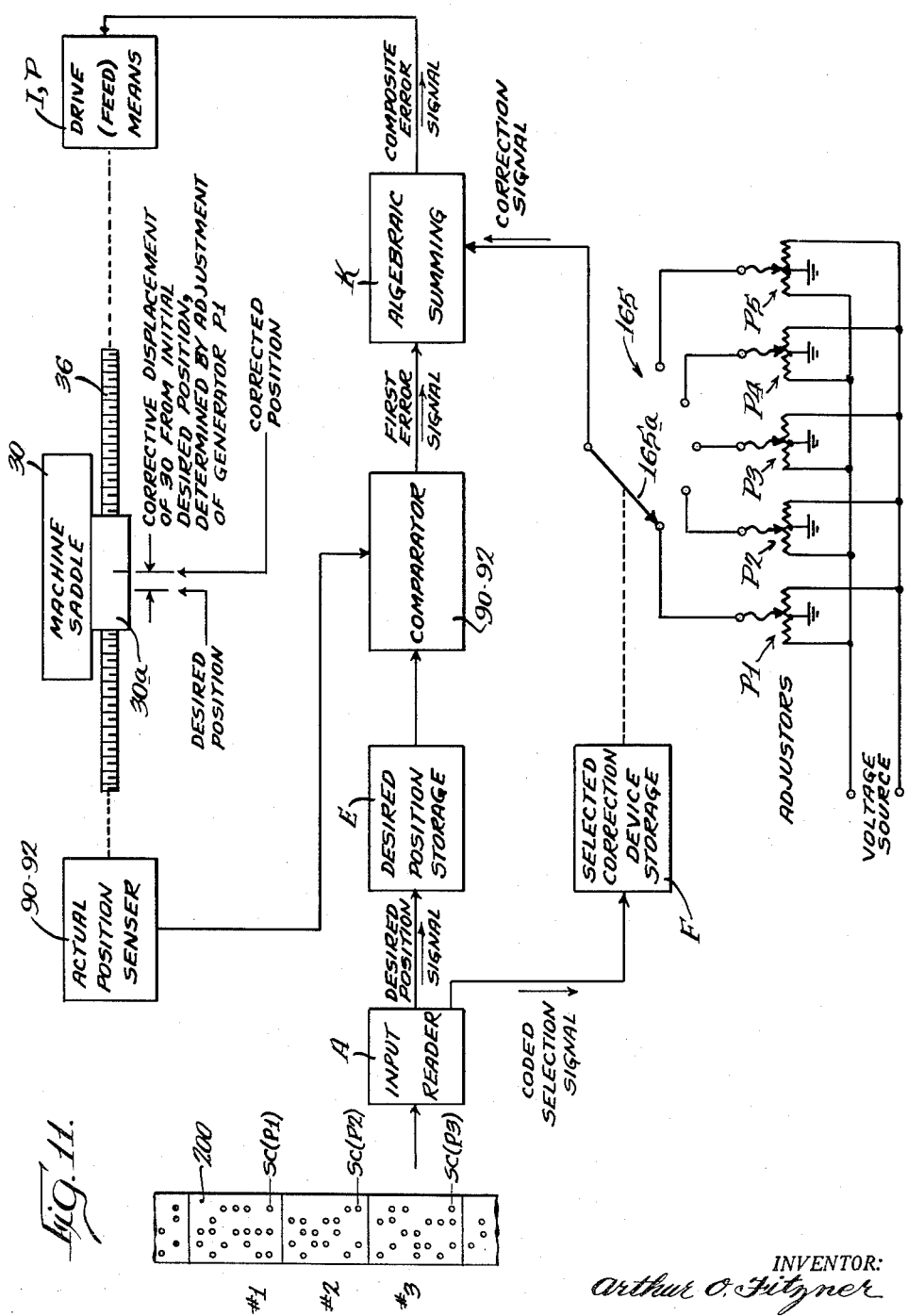

United States Patent Office 3,016,778
Patented Jan. 16, 1962

3,016,778
CONTROLS FOR MACHINE TOOLS AND THE LIKE

Arthur O. Fitzner, Fond du Lac, Wis., assignor to Giddings & Lewis Machine Tool Company, Fond du Lac, Wis., a corporation of Wisconsin
Filed Sept. 24, 1958, Ser. No. 763,057
20 Claims. (Cl. 82—14)

This invention relates in general to systems for controlling machine tools, and relates more particularly to improvements in systems for causing machine tools to execute automatically repetitive cycles of machining operations made up of a plurality of successive machining steps.

It is the general aim of the invention to enhance the flexibility, accuracy, and convenience with which machining operations may be accomplished by automatically controlled machine tools, especially although not exclusively, machine tools of the type which perform turning operations.

An important objective of the invention is to make possible initial "set up" adjustments at the machine tool in order to correctively modify end-positions produced from previously programmed information. This enables convenient compensation for tool wear, tool deflection under load, and other variable conditions peculiar to individual machine tools which cannot be taken adequately into account during programming.

A related object is to provide an arrangement in which such corrections, when once made for the different machining steps, will be repeated as the complete cycle of machining operation is executed a number of times, thereby avoiding the need for re-programming and making feasible the use of the same programmed information on different individual machine tools.

Another related object is to enable corrective adjustments to be "dialed in" to a previously established program of machining steps at any time, whether during an initial run or during later runs.

It is another object of the invention to provide for such corrective adjustments of end-point positions to be made in either direction, and accomplished by relatively simple apparatus through the novel technique of algebraically combining a correction signal with a position error signal.

An additional object is to make it possible for any machining program to proceed automatically from step to step, to be stopped after each step, to repeat the immediately preceding step, or to be interrupted and the machine converted to manual control. This flexibility enables the operator to masure the dimension of a workpiece resulting from an end-point position of a tool-carrying element, to back the tool away from the work, to make the necessary corrective adjustment, and to repeat the step in order to check the accuracy of positioning with the corrective adjustment taken into account.

It is a further object of the invention to provide for automatically slowing the movable element of a machine tool to a fine feed rate before that element reaches an end-point or stopping position, thereby avoiding overshoot, the arrangement being characterized in that value of the relative fine feed rate is corrected in each instance to be inversely related to the speed of a rotatable member, and thus of substantially the same absolute value even though the speed of such member may have any one of several values.

Still another object of the invention is to prevent any change in the feed rate of a movable machine tool element as the latter approaches an end-point or stopping position if the running feed rate is less than the fine feed rate which would otherwise occur.

An additional object of the invention is to enhance the accuracy of end-point positioning by causing the movable element to slow down from a running feed rate to a fine feed rate when it reaches a position displaced from the end-point by a distance which is directly related to its absolute running feed rate. This makes the slowdown occur sooner when the kinetic energy of the translatable element is higher, and facilitates stopping in the desired end-point position without overshoot.

Still another object is to provide such "anticipation" for slowing down by a computer which takes into account two variable or adjustable conditions which together determine the absolute feed rate of the movable element and its kinetic energy.

A related object is to produce such "anticipation" by creating a net control signal which is the result of modifying a position error signal, and which is utilized by the same components that accept the position error signal to determine when the end-point position has been reached.

Other objects and advantages will become apparent as the following description proceeds, taken in conjunction with the accompanying drawings, in which.

Figure 4:
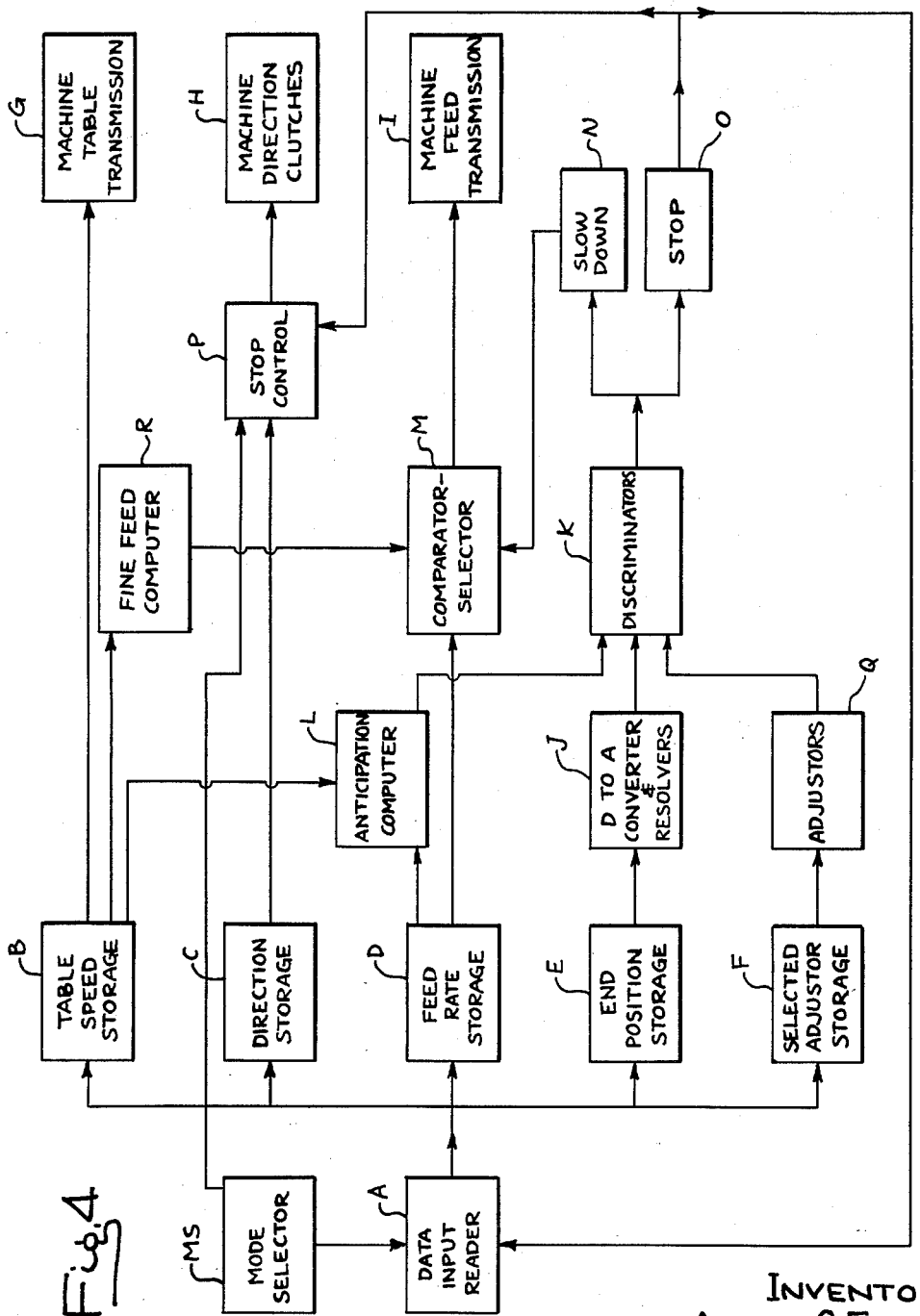
FIG. 4 is a block-and-line diagram of a control system embodying the features of the invention.
Figure 6:
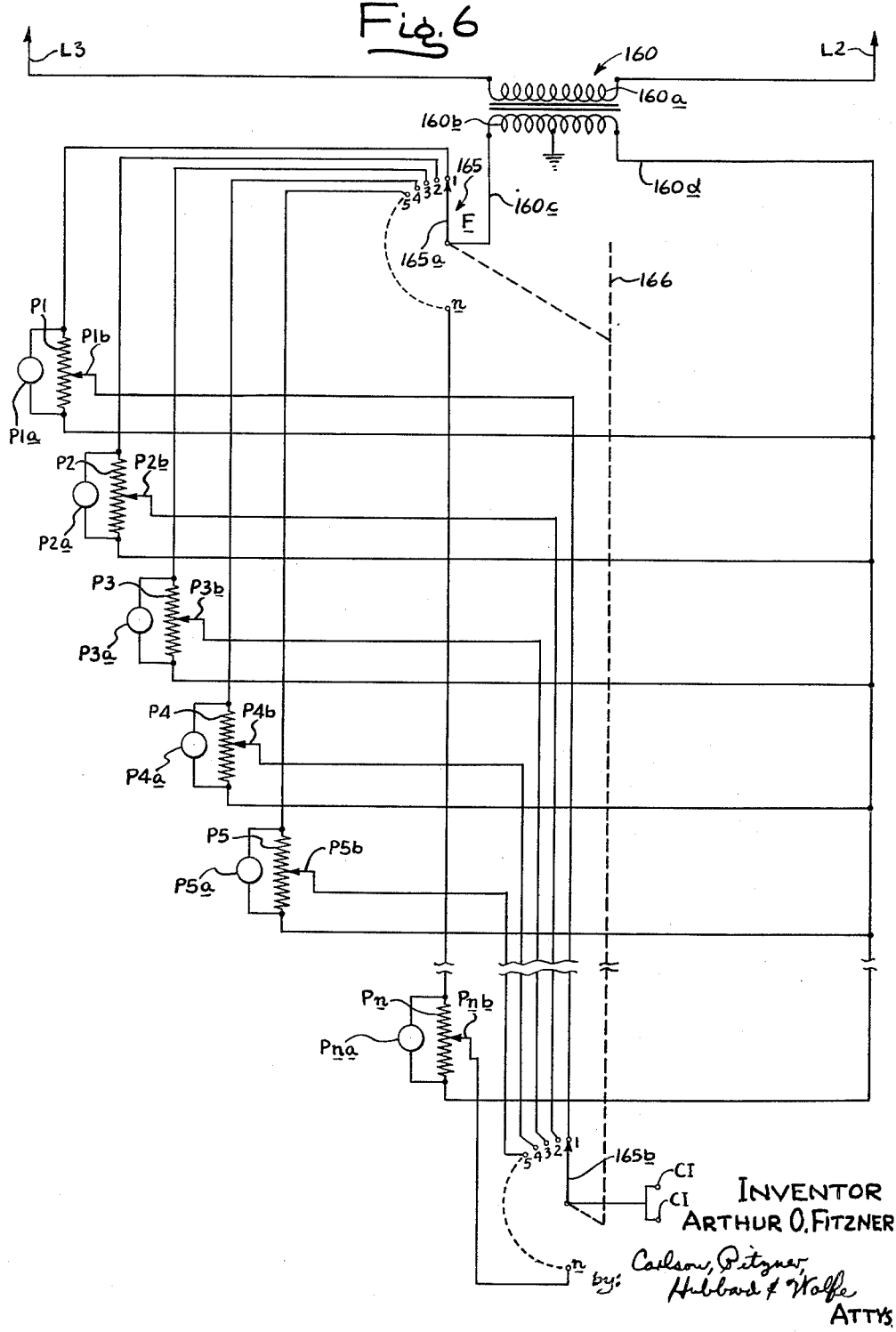

FIGS. 5A, 5B, 5C and 5D, when joined along the indicated junction lines, are a schematic wiring diagram of portions of the system represented in FIG. 4;

FIG. 6 is a schematic wiring diagram of position-correction adjustors and selectors;

FIG. 7 is a diagrammatic illustration of portions of servo controls for moving an element to predetermined positions, especially illustrating the relationship of resolvers and discriminators;

FIG. 8 is a schematic wiring diagram of one of the discriminators, including signal combining means, FIG. 9 is a simplified, diagrammatic illustration of the system components which cooperate to produce the novel "anticipation" function, i.e., to initiate slowdown of a movable machine element when it is displaced from the desired stopping position by a distance which is proportional to the absolute velocity of the element, and despite the fact that the absolute velocity depends upon both the selected table speed and the selected relative feed rate;

FIG. 10 is a simplified, diagrammatic illustration of the system components which cooperate to prevent conversion of the saddle movement from the selected feed rate to a scheduled fine or slow feed rate in the event that the latter would be greater than the former; and FIG. 11 is a simplified, diagrammatic illustration of the system components which cooperate to effect corrective adjustments of programmed end-point or stopping positions for different steps of an over-all machining program, and in which the correction for each step will be automatically included or repeated as that program is repeatedly executed.

While the invention has been shown and will be described in some detail with reference to a particular embodiment thereof, there is no intention that it thus be limited to such detail. On the contrary, it is intended here to cover all alternatives, modifications and equivalents falling within the spirit and scope of the invention as defined by the appended claims.

THE ENVIRONMENT OF THE INVENTION

In order that the invention and its advantages may be fully understood, the background setting or environment for one specific application of the invention will first be briefly considered, particularly with reference to an exemplary machine tool. It will be understood, however, that the invention may be applied in a straightforward manner in other specific environmental settings and with types of machine tools other than the one here shown.

Exemplary machine tool

The machine tool here shown by way of example is a vertical turret lathe 20 (FIG. 1) which, in general terms, includes a rotatable member or table 21 journaled for rotation about a vertical axis in a base 22 and adapted by means such as chuck jaws 23 to rigidly support a workpiece (not shown). Rising above the table 21 are columns 24 connected at their upper ends by a crosspiece 25 and supporting a vertically adjustable crossrail 26. The rail is formed with way surfaces 28 which slidably support a translatable element or saddle 30 for movement in a horizontal direction. The saddle, in turn, slidably supports a vertically movable ram 31 which carries an angularly positionable turret 32 adapted to carry a plurality of cutter tools selectively positionable in the downwardly extending, working position. As here shown, a tool holder 34 carried by the turret 32 is adapted to receive a cutter (not shown) which can machine the workpiece on the rotating table 21 to different diameters and accomplish facing cuts along surfaces disposed radially of the table axis.

The ram 31 is vertically positionable within the saddle by rotation of a lead screw 35, while the saddle 30 is horizontally positionable in response to rotation of an associated lead screw 36. The lead screw 36 is adapted to be driven in either direction and at any of a plurality of angular velocities in order to impart different feed rates or linear velocities to the saddle 30. For this purpose, a multi-speed feed transmission is disposed with a housing 38. Appropriate position indicators and manual control instrumentalities are disposed on the front face of the housing 38.

For further details regarding the organization and operation of the turret lathe 20, reference may be had to Hollis Patent No. 2,831,361, issued April 22, 1958; and to the copending application of John C. Hollis, Serial No. 525,469, filed August 1, 1955, and assigned to the assignee of the present application. While the features of the present invention may be applied to the control of motions and positions of several other movable elements such as the ram 31, they will, for brevity, be described here only in relation to the feeding and positioning of the saddle 30 in coordination with rotation of table 21.

Table speed transmission

The rotatable member or table 21 (FIG. 1) is adapted to be driven at any one of a plurality of rotational speeds. In order to understand how this is accomplished by electrical controls, a multi-speed table transmission having a plurality of electromagnetically operated clutches is illustrated in FIG. 2. As there shown, a prime mover or electric motor 40 has its output shaft 41 drivingly connected to a shaft 42 with either of two drive ratios in response to energization or deenergization of a speed clutch coil SC1. Energization of that coil shifts an armature 44 against the bias of a spring 45 and causes driving engagement of a clutch member 46 splined to the shaft 41 with a gear 48 journaled on that shaft. When the clutch coil SC1 is deenergized the spring 45 holds the clutch member 46 in driving engagement with a second gear 49 journaled on the shaft 41. The gears 48 and 49 are respectively meshed with gears 50 and 51 fast on the shaft 42, so that the latter will be driven from the motor shaft 41 at either of two speeds, depending upon whether the clutch coil SC1 is denergized or energized.

In a similar manner, a clutch assembly 52 controlled by a clutch coil SC2 is interposed between the shaft 42 and a third shaft 53, so that the latter may be driven at any of four speeds depending upon the particular combination of the clutch coils SC1, SC2, which are energized. Further, the shaft 53 is drivingly connected to a fourth shaft 54 through a similar clutch assembly 55 controlled by a clutch coil SC3. Finally, the shaft 54 is drivingly connected to a final output shaft 56 through a clutch assembly 58 controlled by an associated clutch coil SC4 so that for each speed of the shaft 54 the shaft 56 may be driven at either of two speeds, depending upon whether the clutch coil SC4 is energized or deenergized. The output shaft 56 carries a pinion 59 meshed with a beveled ring gear 60 rigid with the table 21.

It will be apparent that depending upon the particular one of sixteen possible combinations of the four clutch coils SC1–4 which are energized, the table 21 may be driven at any one of sixteen possible rotational speeds. For convenience, these speeds are numbered and their exemplary values indicated opposite the corresponding combinations of the four clutch coils which are energized to produce those speeds in the following table:

TABLE II

| Speed No. | Table Speed (rev./min.) | Energized Clutch Coils | | | |
|---|---|---|---|---|---|
| | | SC1 | SC2 | SC3 | SC4 |
| 1 | 24 | | | | |
| 2 | 28 | x | | | |
| 3 | 34 | | x | | |
| 4 | 40 | x | x | | |
| 5 | 48 | | | x | |
| 6 | 56 | x | | x | |
| 7 | 68 | | x | x | |
| 8 | 80 | x | x | x | |
| 9 | 96 | | | | x |
| 10 | 112 | x | | | x |
| 11 | 136 | | x | | x |
| 12 | 160 | x | x | | x |
| 13 | 192 | | | x | x |
| 14 | 224 | x | | x | x |
| 15 | 272 | | x | x | x |
| 16 | 320 | x | x | x | x |

The multi-speed table transmission of FIG. 2 is only diagrammatically illustrated, and a more detailed, preferred organization is shown and described in the above-identified copending Hollis application.

Saddle feed transmission

The multi-speed feed transmission for translating the saddle 30 in either direction and at any of a plurality of relative feed rates may be of the type disclosed and claimed in the above-identified Hollis patent. To facilitate an understanding of the present invention, such feed transmission is diagrammatically illustrated in FIG. 3, having an input member in the form of a gear 61 which is meshed with and driven from a gear 62 (FIG. 2) which rotates in timed relation to the table 21. Therefore, the input to the feed transmission is always at a speed which is related to the table speed. Drivingly connected between the input gear 61 and a shaft 63 are four two-speed gearing and clutching assemblies 64, 65, 66, 67 respectively controlled by four feed clutch coils FC1, FC2, FC3 and FC4. The gearing and clutching assemblies 64–67 are here shown as identical to such assemblies appearing in FIG. 2, and therefore need not be described in detail. It is sufficient to note only that, for a given speed of the input gear 61 (i.e., a given speed of the table 21), the final shaft 63 may be driven at any of sixteen possible speeds or rates, depending upon the particular combination of the four clutch coils FC1–4 which are energized.

In order to control starting and stopping of the saddle 30, and the direction of its movement, the shaft 63 is drivingly connected through two normally disengaged forward and reverse clutches 68, 69 to the lead screw 36 which is threadably engaged with a nut 30a connected to the saddle. Energization of a forward clutch coil FWD shifts a clutch member 68a splined to the screw 36 into engagement with a gear 68b journaled on that screw and meshed with a gear 63a fixed to the shaft 63. This will drive the lead screw 36 in a rotational direction which makes the saddle 30 move in a forward direction, i.e., from right to left in FIG. 1. Alternatively, energization of a clutch coil REV will shift a clutching member 69a splined to the lead screw 36 into engagement with a gear 69b journaled on that screw and coupled through an idler gear 70 to a gear 63b rigid with the shaft 63. This will cause the lead screw 36 to rotate in such a direction as to move the saddle 30 reversely, i.e., from left to right. When neither of the clutch coils FWD or REV is energized, then the saddle 30 will be stopped, even though the table 21 is turning.

Also associated with the lead screw 36 is a normally released brake 71 which is engaged upon energization of an associated brake coil BR. Engagement of the brake 71, after disengagement of both clutches 68 and 69, brings the saddle to an abrupt stop without coasting.

In order that exemplary values of the sixteen possible relative feed rates of the saddle will be readily apparent, together with the particular combinations of the four feed clutch coils FC1–4 which must be energized in order to produce each such relative feed rate, these are tabulated in the following table:

TABLE II

| Feed No. | Feed Rate (in./rev.) | Energized Clutch Coils | | | |
|---|---|---|---|---|---|
| | | FC1 | FC2 | FC3 | FC4 |
| 1 | .0007 | | | | |
| 2 | .0011 | x | | | |
| 3 | .0015 | | x | | |
| 4 | .002 | x | x | | |
| 5 | .003 | | | x | |
| 6 | .004 | x | | x | |
| 7 | .006 | | x | x | |
| 8 | .009 | x | x | x | |
| 9 | .012 | | | | x |
| 10 | .018 | x | | | x |
| 11 | .024 | | x | | x |
| 12 | .036 | x | x | | x |
| 13 | .048 | | | x | x |
| 14 | .072 | x | | x | x |
| 15 | .096 | | x | x | x |
| 16 | .144 | x | x | x | x |

Figure 2:
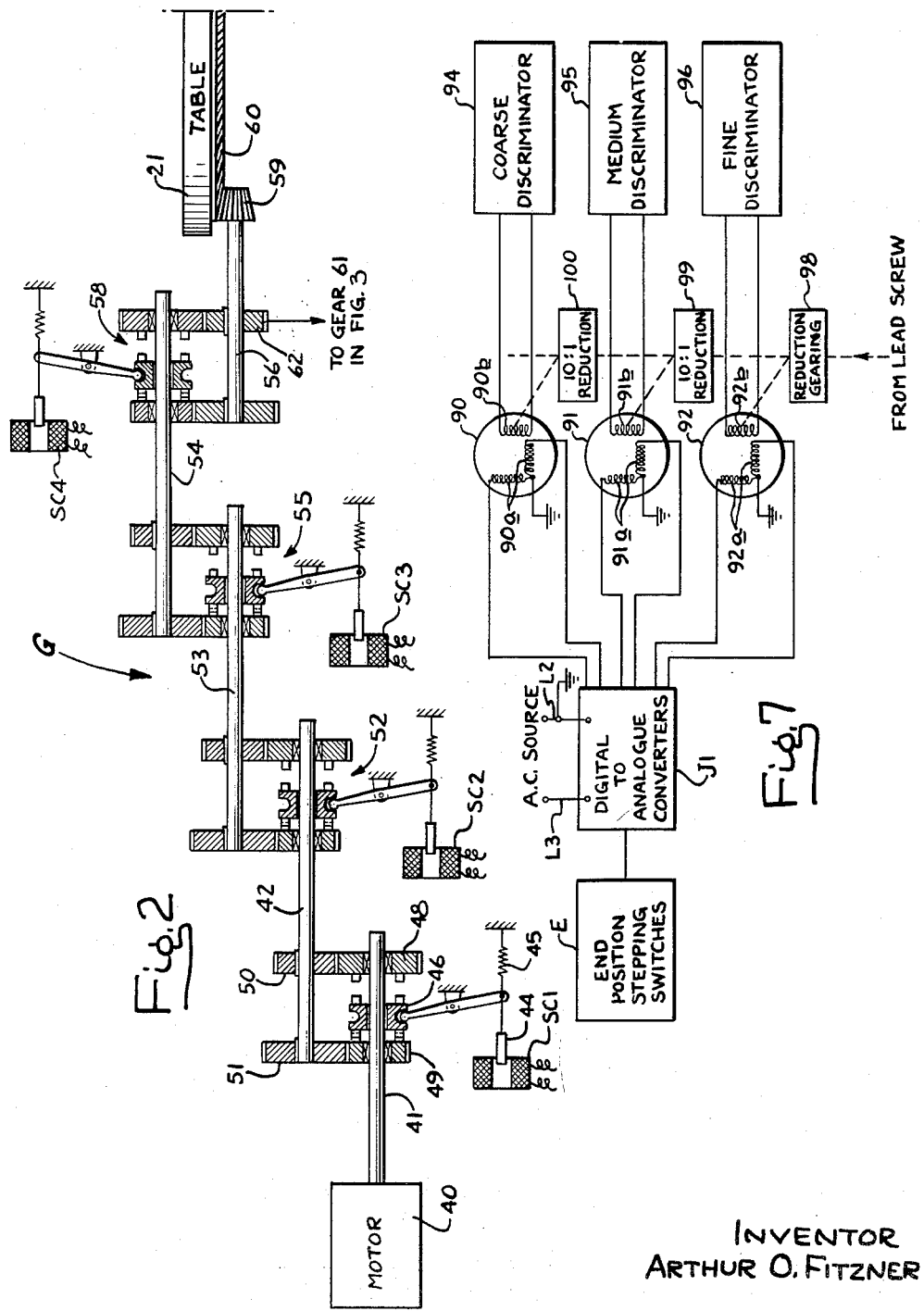
FIG. 2 is a diagrammatic illustration of an exemplary multi-speed transmission for driving the rotatable machine tool table.
Figure 3:
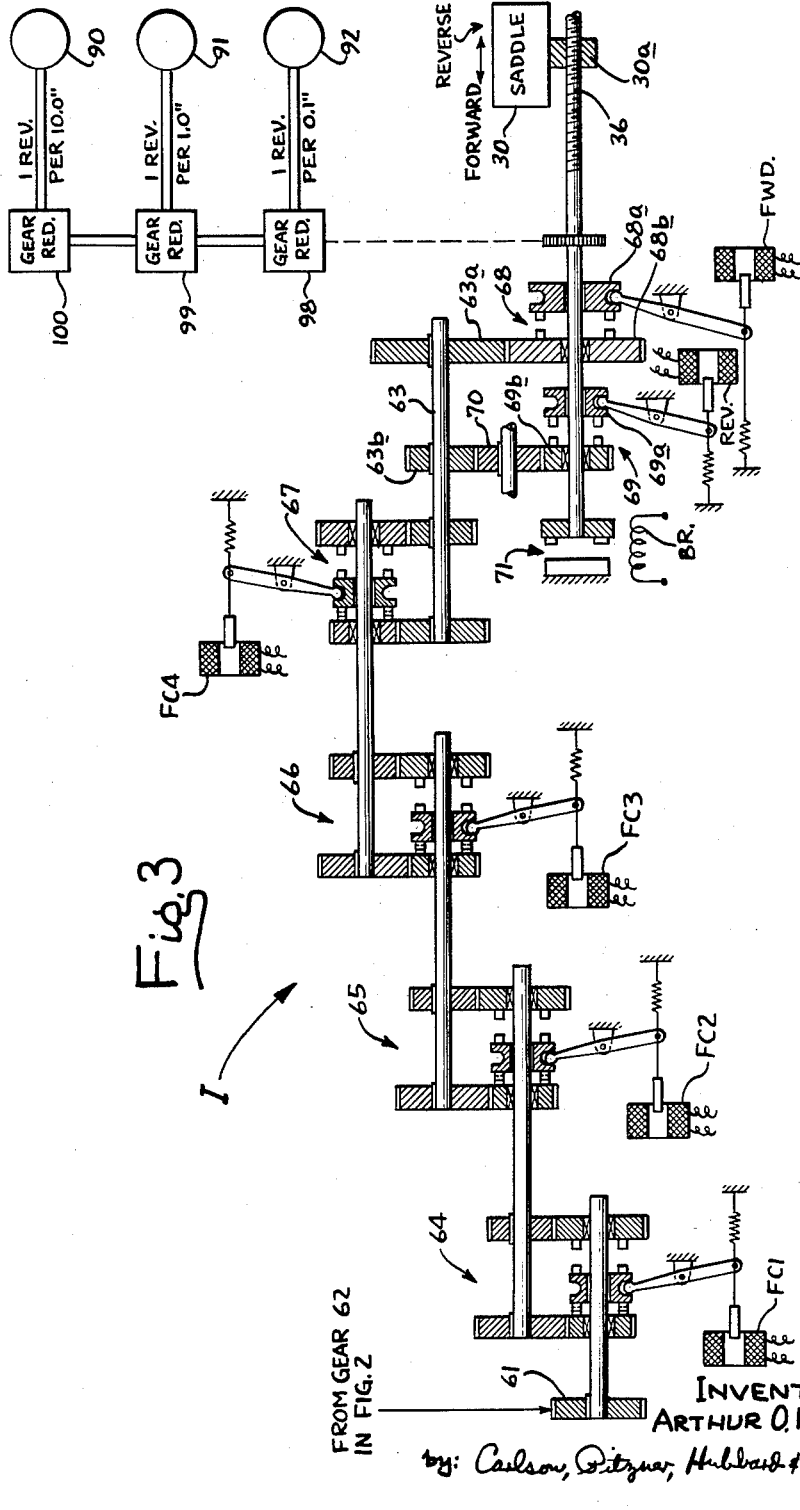
FIG. 3 is a diagrammatic illustration of an exemplary multi-speed transmission for translating the saddle of the machine tool at different feed rates.

It is to be noted that the feed rates tabulated in the foregoing table are relative feed rates expressed in "inches per table revolution," in view of the fact that the speed of the input gear 61 depends on the speed of the table 21. The absolute feed rate or velocity in "inches per minute" at which the saddle 30 moves depends upon both the setting of the speed transmission (FIG. 2) and the setting of the feed transmission (FIG. 3).

THE CONTROL SYSTEM IN GENERAL

The system as diagrammatically illustrated in FIG. 4 comprises a data input device or reader A which is adapted to supply successive sets of information which will govern the operation of the machine tool during succeeding steps of an over-all machining operation. The reader A may, for example, be a punched tape reader which accepts a punched tape having rows of holes therein digitally representing symbols or numerals for the various adjustable conditions which may change from step to step in an over-all machining operation.

Each "block" of data for controlling each step of machining includes information as to the speed at which the machine table 21 is to be driven. Such information will be supplied to a table speed storage means B which, in turn, controls the energization of the clutches in the table speed transmission G (shown in detail by FIG. 2). Each such block of data further includes indicia or information designating the direction in which the translatable element or saddle 30 is to be moved in order to move a cutter carried by the turret 32 (FIG. 1) to a desired end-point position. Such direction information is supplied from the reader A to direction storage means C which, in turn, works through a stop control P to properly energize the machine direction clutches H (i.e., clutches FWD and REV of FIG. 3).

Further, each block of data includes information transferred from the reader A to a feed rate storage D in order to determine the running feed rate at which the saddle 30 (FIG. 1) moves toward the desired end-point position. The feed rate storage D works through a comparator-selector M to properly energize the clutches in the machine feed transmission I (such as that detailed in FIG. 3). Moreover, each block of input data includes numerical information defining the end-point position to which the saddle 30 and the cutting tool movable therewith are to be translated to carry out one machining step. This position data is transferred from the reader A to an end-position storage E which supplies that information to digital-to-analog converters and resolvers J forming part of a positioning servo system and which produce error signals applied to discriminators K.

Finally, each block of data read by the reader A may contain information which selects a particular adjustor or correcting device, and such information is transferred from the reader A to storage means F which connects a certain one of adjustors Q in controlling relationship to the discriminators K.

FIG. 4 indicates functionally that as each block of information relating to each successive step of machining operation is supplied to the system, table speed storage means B, direction storage means C, feed rate storage means D, end-point position storage means E, and selected adjustor storage means F are all set to the proper conditions to represent that block of input information.

The three components E, J, K, operate to produce an error signal whenever there is a discrepancy between the end-point position represented by the data stored in the storage means E and the actual position of the translatable element being controlled, i.e., the saddle 30. Such an error signal appearing after a block of information has been read is utilized to cause movement of the saddle in a direction determined by the status of the machine direction clutches H and at a relative running feed rate determined by the status of the machine feed transmission I, while the machine table 21 is driven at a rotational speed determined by the status of the machine table transmission G. These latter components G, H and I are set in accordance with the data stored by the storage devices B, C and D.

In accordance with certain features of the invention which will be more fully described below, provision is made to cause the machine tool element to slow down before it reaches the final or end-point position and preferably to slow down when it reaches a point displaced from the end-point by a distance which is proportional to the absolute feed rate or velocity of the saddle 30. This initiation of slow down at an anticipation point dependent upon the running velocity improves the accuracy of stopping at the end-point position by avoiding overshoot. It is accomplished in general, through the provision of an anticipation computer L which senses (a) the speed at which the table is rotating from the table speed storage B and (b) the relative running feed rate at which the saddle is moving from the feed rate storage D. The output of the anticipation computer L is an anticipation signal which is algebraically combined with the error signal in the discriminators K so that the latter activate a slowdown device N at the instant when the change-over to a fine feed rate should take place.

Further in accordance with the invention, however, provision is made to prevent the saddle 30 from being reduced to its fine feed rate if the running feed rate is less than the fine feed rate which would otherwise occur. For this purpose a fine feed computer R is employed to determine the value of a relative fine feed rate which at the selected table speed will result in an absolute fine feed rate which is of a substantially uniform value regardless of the table speed. The fine feed computer senses the existing table speed from the table speed storage B, and provides an output response which designates the relative fine feed necessary to produce the desired absolute fine feed value. This relative fine feed signal or indication produced by the fine feed computer R is compared by the comparator M with the existing running feed rate represented by the condition of the feed rate storage D. Only if the running feed rate is greater than the computed fine feed rate will the comparator-selector M pass signals to the machine feed transmission I to produce the desired fine feed rate.

When the translatable element or saddle 30 has reached the desired end-point position represented by data stored at E, the discriminators K supply a signal to a stop means O, which, in turn, activate the stop control P so that the machine direction clutches H are conditioned to terminate the saddle movement. The stop response provided at O is also fed back to the data input reader A which causes the latter to read off the next block of information and to supply appropriate information to the several storage means.

The organization and operation of the selected adjustor storage F and the adjustors Q, in providing for corrections in the actual end-point positions which are reached by the movable element, will be taken up in greater detail hereafter.

*Table speed storage and control*

FIGS. 5A, 5B, 5C and 5D illustrate in more detail the various components of apparatus represented in block form by FIG. 4. The table speed storage B may, in one form, be constituted by a multi-position switch 80 having a plurality of banks of stationary contacts selectively engageable by rotatable wipers 80*a–j*. These wipers are all connected to a common shaft 81, schematically represented by a dashed line, adapted by any of a variety of means well known in the art to be set to any one of the sixteen positions corresponding to a particular table speed designated by the input data received from the reader A. For example, the switch 80 may be a stepping switch of well known construction which is so arranged as to be stepped to any of the angular positions 1 through 16 whenever table speeds 1 through 16 (Table I) are designated by the input information. Alternatively, the shaft 81 and the wipers connected therewith may be manually set to any of the sixteen possible positions.

The four switch wipers 80*a*, 80*b*, 80*c*, and 80*d* (FIG. 5A) are selectively connected across D.C. voltage supply lines L1, L2 through their associated stationary contacts and respective ones of the speed clutch coils SC1, SC2, SC3, and SC4. These connections are made through normally closed transfer relay contacts TR2, TR4, TR6 and TR8, respectively. The connections between the voltage supply line L1 and the sixteen stationary contacts associated with the wipers 80*a–d* are so correlated that as those wipers move through their sixteen posible positions the speed clutch coils SC1-4 will be energized in the combinations designated by Table I to produce the sixteen possible table speeds. Thus, the angular setting of the switch shaft 81 and the associated wipers constitutes a storage of the desired table speed and also effects energization of the clutch coils SC1-4 within the speed transmission in order to set the latter to produce the particular table speed represented by the angular position of the shaft 81.

*Direction storage and control*

The direction storage C (FIG. 4) may be here constituted by a two-position switch 84 (FIG. 5D) which is adapted to be set to one position or the other, according to whether the input data from the reader A designates that the saddle is to be moved in a forward or a reverse direction. The switch 84 by the position of its movable arm to an upper or lower stationary contact, stores and represents the desired direction of saddle movement, constituting a part of an energization circuit for the forward clutch coil FWD when in the upper position and constituting a part of an energization circuit for the reverse clutch REV when in the lower position. Thus, assuming that the stop control P calls for motion of the saddle 30, the direction storage switch 84 will result in energization of the appropriate direction clutch coil to produce movement in the desired direction. This operation will be treated in more detail below.

*Feed rate storage and control*

Figure 5A:
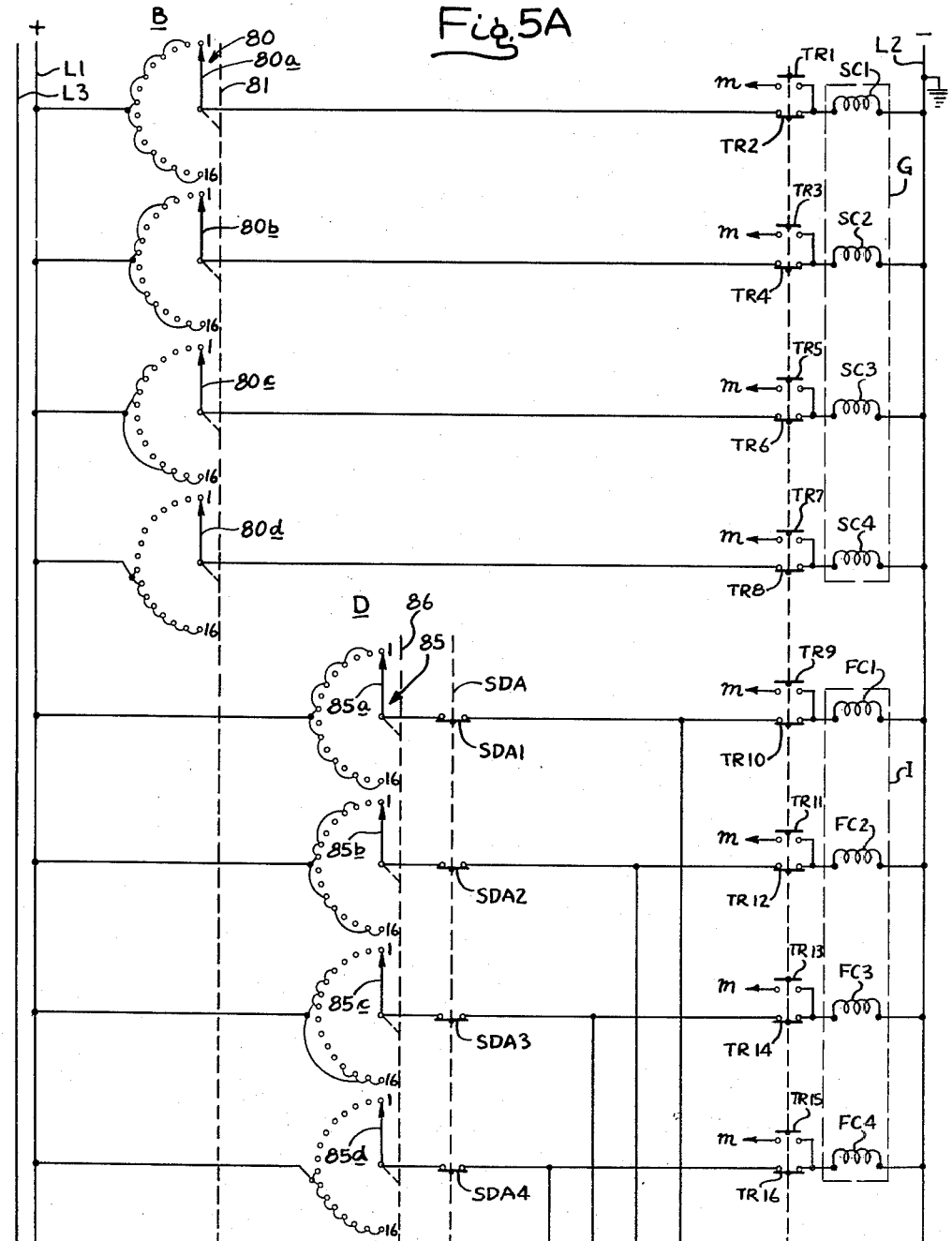

The feed rate storage D (FIG. 4) may, in one form shown by FIGS. 5A–C, be a multi-position switch 85 having a plurality of rotatable contact wipers 85*a–f* connected to a common shaft 86 and selectively engageable with any of sixteen stationary contacts associated with each. The shaft 86, in a manner similar to the shaft 81, is set to a particular one of its sixteen possible angular positions by feed rate information received from the data input reader A (FIG. 4), and thus by its angular position during any particular machining step, stores the relative feed rate at which the saddle 30 will be translated.

In order to control the four clutches in the feed rate transmission of FIG. 3 so as to produce the particular feed rate designated by the angular position of the shaft 86, the switch wipers 85*a–d* are respectively connected across the D.C. voltage supply lines L1, L2 through their stationary contacts, through normally closed contacts SDA1-4, and through normally closed contacts TR10, TR12, TR14 and TR16 in series with the feed clutch coils FC1, FC2, FC3 and FC4, respectively. A particular combination of the stationary contacts associated with each of the switch wipers 85*a–d* is connected to the positive voltage supply line L1 such that the feed clutch coils FC1-4 will be energized in the sixteen possible combinations shown by Table II, supra, as the shaft 86 and the wipers are moved to their sixteen successive positions. It will be evident from an inspection of the connections to these stationary contacts that the feed clutch coils FC1-FC4 will, under normal circumstances, be energized in the proper combinations to produce any desired relative feed which may be represented by the angular position of the switch shaft 86.

*End-position storage and control*

The end-position storage E (FIG. 4) and the associated converters and resolvers J together with the discriminators K may take the detailed form which is more fully disclosed and claimed in my copending application Serial No. 763,103, filed Sept. 24, 1958, and assigned to the assignee of the present application. Those components have been shown in diagrammatic form by FIG. 7, where the position storage E is labeled as constituted by a plurality of stepping switches which are set in accordance with end-position information to angular positions numerically and digitally representing the desired end-position. Such stepping switches control digital-to-analog converters J1 which, in turn, produce analog excitation signals for stator windings 90*a*, 91*a*, 92*a* of coarse, medium and fine resolvers 90, 91, and 92. These three resolvers have rotor windings 90*b*, 91*b*, 92*b*, which are electrically connected to coarse, medium and fine discriminators 94, 95 and 96.

The rotors which carry windings 90*b*, 91*b*, 92*b* are mechanically connected to be driven in timed relation to the movement of the translatable element or saddle 30 (FIGS. 3 and 7) through successive sets of reduction gears 98, 99 and 100, the gear ratios being chosen preferably such that the rotor of the coarse resolver 90 turns at a rate of one revolution per 10 inches of saddle movement, the rotor of the medium resolver 91 turns at a rate of one revolution per inch of saddle movement, and the rotor for the fine resolver 92 turns at a rate of one revolution for 0.1 inch of saddle movement. In actual practice, a greater number of successively driven resolvers might be employed to produce a wider range of controlled movement for the saddle, but the present illustration of three resolvers will illustrate the basic organization and operation of the positioning apparatus.

Briefly stated, the digital-to-analog converters J1 function to excite the resolvers 90–92 in order to produce magnetic fields therein which will induce A.C. error signals in the respective rotor windings 90b–92b which are proportional in magnitude to the sine of, and agreeable in phase polarity with, the angular displacement of the rotors from a unique angular position defined by the numerical information digitally represented by the stepping switches E. By way of example, if a particular end-point position of 2.345 inches (measured from a suitable reference point along the path of travel of the saddle 30) is stored in the stepping switches E, then the coarse resolver 90 will be excited so that its rotor winding 90b will produce an error signal until that rotor winding has been physically driven to an angle which signifies that the saddle 30 has reached a position corresponding substantially to 2.3 inches. Similarly, the medium resolver 91 will be excited such that its rotor winding 91b will produce an error signal until that rotor winding has been angularly driven to a position which signifies that the saddle 30 has moved from the reference position 0.34 inches plus some integral multiple of one-half inch. Finally, the fine resolver 92 will be excited such that its rotor winding 92b will produce an error signal until it is moved to an angular position signifying that the saddle 30 has been moved 0.045 inch plus some integral multiple of 0.05 inch.

Unless the saddle 30 is at the end-point position represented by information stored in the stepping switches E, therefore, the rotor winding 90b wil produce an A.C. error voltage related in magnitude to the difference between the actual position of the saddle 30 and the stored information representing the end-point position to the nearest tenth of an inch. Such voltage will be of a phase polarity which corresponds to the sense of such difference. The rotor winding 91b will produce an A.C. error voltage related in magnitude to and agreeable in phase polarity with the extent and sense of the difference between the actual position of the saddle 30 and the stored information representing the end-point position to the nearest one-hundredth of an inch. Finally, the rotor winding 92b will have induced therein an A.C. error voltage which is related in magnitude to, and agreeable in phase polarity with, the extent and sense of the error between the saddle position and the stored information representing the end-point position to the nearest thousandth of an inch.

Although the error signals induced in the medium and fine rotor windings 91b and 92b may pass through several zero or null values as the saddle is moved through a relatively great distance to reach a desired end-point position, the movement of the saddle is not terminated because at those instants the coarse rotor winding 90b will not be producing a null or zero error response.

The three discriminators 94, 95 and 96, are substantially identical in organization, and FIG. 8 will serve to illustrate the construction and operation of all three. As shown in FIG. 8, each of the discriminators has input terminals 105, 106 adapted to receive the error signal produced by the associated resolver rotor winding. That signal is coupled through a resistor 107 to the control electrode 108a of a suitable amplifying discharge device or pentode vacuum tube 108. The anode 108b of the latter is connected to a positive D.C. voltage source (here represented by the symbol B+) through a load resistor 109, and its cathode 108c is connected directly through a self-biasing circuit 110 to a point of reference potential (here shown as ground) common to the input terminal 105.

The error signal appears in amplified form at the anode 108b and is coupled through a stabilization circuit 112 to a phase inverter 113. The phase inverter comprises two triode discharge devices 114, 115 having their cathodes connected through a common resistor 116 to a point of negative potential (here conventionally symbolized as B—). With the control electrode 115a of the triode 115 connected by a resistor 118 directly to ground, there is direct cathode coupling between the triodes 114 and 115. Therefore, as the amplified error signal is supplied to the control electrode 114a, it will appear at the anode 114b in phase with the signal applied to the terminals 105, 106 and will appear at the anode 115b with opposite phase (180° displaced) relative to signal at 105, 106.

To afford adjustment in the net gain of the pentode 108, to stabilize its operation, and to adapt it to work as a summing amplifier (for a purpose made clear below), an adjustable negative feedback circuit is employed. The signal appearing at the anode 115b is always 180° out-of-phase with the A.C. input signal at 106, 105. It is coupled back to the control electrode 108a through a capacitor 117 and a potentiometer 119 having a wiper leading through a resistor 119a to the grid 108a. Adjusting the wiper changes the effective amplitude of the feedback signal which always subtracts from the error input signal, thereby changing the gain or ratio between the amplitude of the input error signal and the amplified signals at the anodes 114b, 115b.

These phase-displaced signals appearing at the anodes 114b and 115b (A.C. voltages proportional in magnitude to the input error signal) are coupled to the control electrodes 120a, 121a of two thyratron type discharge tubes 120 and 121. The anodes 120b and 121b of the respective thyratrons are connected in series with relays PL and MI to one side of an A.C. voltage source (here represented by a supply line L3). Capacitors parallel with the relay coils insure that the relays will remain picked up when intermittent current pulses flow through such coils.

The control electrodes 120a, 121a are biased below cutoff by the connection through resistors 124, 125 to a negative biasing voltage divider 126. Thus, unless the A.C. signal voltage applied to the control electrodes 121a is (a) in phase with the A.C. voltage appearing on the line L3 and applied to the respective anodes 120b, 121b, and (b) of greater than a predetermined amplitude, the thyratrons 120 and 121 cannot fire or conduct current during any portion of each cycle of the A.C. source voltage. Under these conditions, the relays PL and MI will both be deenergized.

Whenever the error signal applied to the input signals 105, 106 is greater than a predetermined magnitude, one of the thyratrons 120 or 121 will conduct current during a portion of each cycle of the alternating voltage appearing on the line L3, depending upon whether that error signal is of one phase or the other, i.e., whether the position error is of a postive or negative sense. Thus, as explained in applicant's above-identified copending application, one or the other of the relays PL or MI will be energized whenever a positive or negative position error greater than a predetermined value is produced by the associated resolver. That predetermined value, or the width of the "deadband," may be varied by adjusting the feedback potentiometer 119. Whenever the position error becomes less than such predetermined value both of the relays PL and MI will be simultaneously deenergized thereby signifying that the associated resolver has been physically driven from the lead screw of the saddle 30 to within a predetermined deadband of an absolute null position.

Referring now to FIG. 5C, the coarse, medium and fine discriminators 94, 95, 96 are there illustrated as having relay contacts which are controlled according to the energization of the relays PL and MI therein. These relay contacts are connected in circuit with the coil of a final position relay FP across the voltage supply lines L1 and L2. Assuming for the moment that the relay contacts FR1 and FR2 are in the positions illustrated, i.e., normally open and normally closed, if a negative error response is provided by the coarse discriminator 94 then the contacts MI1a will be closed and the contacts MI1b opened. Thus the relay FP will be energized and picked up by current flow through the contacts MI1a.

If after the coarse discriminator 94 is satisfied and both the relays PL and MI therein be deenergized, the relay FP will, nevertheless, be energized as long as the medium discriminator 95 provides a negative error response resulting in actuation of the contacts MI2a and MI2b. Current flows through the contacts MI2a and normally closed contacts PL1b to the relay coil FP. Closure of contacts PL3a or MI3a in the fine discriminator 96 can produce no change in this condition.

If, however, the medium discriminator 95 is then satisfied so that both of the relays therein are deenergized, the relay FP will remain picked up by current flow through the contacts MI3a, PL2b and PL1b so long as the fine discriminator senses a negative error. When the fine discriminator 96 is satisfied so that both the contacts PL3a and MI3a are opened, the relay FR will be deenergized, thereby signifying that the desired position has been reached by the movable element or saddle 30.

The above-described operation will be substantially the same if the relay contacts FR1 are closed and the contacts FR2 opened, and the three discriminators 94, 95 and 96 sense positive errors and are sequentially satisfied. The relay FP will remain energized so long as the coarse discriminator 94 provides a positive error response and regardless of conditions of the medium and fine discriminators 95 and 96. Once the coarse discriminator 94 is satisfied, the relay FP will remain energized so long as the medium discriminator 95 provides a positive error response, and regardless of the state of the fine discriminator 96. Finally, when both the coarse and medium discriminators 94, 95 are satisfied, the relay FP will remain energized until the fine discriminator 96 is satisfied, indicating that the saddle 30 is at the desired end-point position, whereupon the relay FR will be deenergized.

In a manner to be described, this dropping out or deenergization of the relay FP is caused to deenergize the activated one of the forward or reverse clutch coils FWD or REV, so that drive from the feed transmission (FIG. 3) to the saddle lead screw is interrupted and the saddle brought to a halt. When this occurs, a signal is produced to cause a new block of controlling data to be inserted into the several storage means of FIG. 4 so that the cycle of operation for the next succeeding machining step is repeated.

SLOW DOWN ANTICIPATION COMPUTER AND CONTROLS

As previously noted, during each successive machining step, the table 21 may be made to rotate at any one of sixteen possible speeds. Moreover, the saddle 30 may be made to move toward the desired end-point position for any step at any one of sixteen possible relative feed rates. These selected relative feed rates are here termed the "running" feed rates. Thus, the velocity of the saddle 30 and the components carried thereby may vary considerably.

In order to prevent overrunning of the saddle 30 beyond the desired end-point position represented by the end-point storage means and sensed by the discriminators 94, 95, 96, it is highly desirable to reduce the velocity of the saddle 30 as the latter closely approaches the end-point position. Thus, release of the engaged direction clutch 68 or 69 (FIG. 3) and actuation of the brake 71 can bring the saddle to a halt without overshooting the end-point position.

To improve this slowing down action, provision is here made to sense the velocity at which the saddle 30 is moving and to effect the slow down in its motion when the saddle is displaced from an end-point position by a distance which is variable from step to step, and which is directly related to the velocity of the saddle. For this purpose, the anticipation computer L (FIG. 4) is made to produce an anticipation signal which represents the distance before each end-point position at which the saddle should be slowed from the running feed rate to a fine feed rate.

The anticipation computer L is detailed in FIG. 5B. It receives as a first input an indication of the speed at which the table 21 is rotating, such indication being provided by the position of the movable wiper 80i connected to the shaft 81 of the table speed storage switch 80. This indication of the selected table speed is converted into an A.C. voltage which is directly related (and preferably proportional) to the speed at which the table is rotating, regardless of which one of the sixteen possible table speeds have been selected and effected by the setting of the switch 80. For this purpose, the sixteen stationary contacts engaged by the wiper 80i as the table speed is set to its sixteen respective speeds (Table I, supra) are connected to spaced taps on a voltage divider. The latter is here shown as a resistor 130 connected across an A.C. voltage source represented in FIG. 5B by an A.C. supply line L3 and the supply line L2 (at ground potential). As the switch 80 is moved to positions 1–16 corresponding to table speed numbers 1–16 (Table I), a progressively increased A.C. voltage will appear on the wiper 80i relative to the supply line L2 (ground). This latter voltage is termed the "speed voltage" and is increased in amplitude as the table speed is increased from one setting to the next.

As shown in FIG. 5B, the wiper 80i leads through the primary winding 131a of a transformer 131 having a center tapped secondary winding 131b. There is thus induced on the output conductors 132a and 132b two A.C. voltages (measured relative to ground) which are in amplitude directly related (and preferably, although not necessarily, proportional) to the rotational speed at which the table 21 is operating. Moreover, these voltages appearing on the conductors 132a and 132b are of relatively opposite phase polarity.

A particular one of these two A.C. voltages is supplied to a common conductor 134 through one or the other of normally open contacts FR3 and normally closed contacts FR4, depending upon whether or not the relay FR is actuated. The relay FR (FIG. 5D) is a "forward" relay and is connected to be energized whenever the forward clutch coil FWD is energized to make the saddle move in a forward direction. Thus, if the saddle is moving in a forward or a reverse direction, the relay FR will be picked up or dropped out. In this manner, the speed voltage appearing upon the conductor 134 is made to be substantially proportional in amplitude to the speed at which the table is rotating in any machining step, and of a phase polarity which agrees with the sense or direction of saddle movement.

The absolute velocity of the saddle 30 depends not only upon the table speed, but also upon the selected relative feed rate. To take this into account, the anticipation computer receives as a second input an indication of the particular relative running feed which has been selected for any machining step, i.e., an indication of the setting of the feed transmission of FIG. 3. For this purpose, the wiper 85e connected with the shaft 86 of the feed storage switch 85 is made to move through sixteen successive positions as the relative feed rate takes on the sixteen possible values (Table II), and to engage sixteen associated stationary contacts. These contacts are connected to spaced taps of a voltage divider, here shown as a resistor 135. The total voltage applied to energize the resistor 135 is the speed voltage on the conductor 134. That is, the lower end of the resistor is connected to the conductor 134 and the upper end connected to ground.

As the switch 85 is set to produce higher feed rates, the wiper 85e in moving from its first toward its sixteenth contact will receive a larger fraction of the "speed voltage" appearing across the resistor 135. The resulting voltage on the wiper 85e is thus directly related (and preferably proportional) to the product of the table speed and saddle feed rate. For example, if the A.C. source voltage across the lines L3, L2 is a constant V volts, the speed voltage on the conductor 134 will be proportional to V$s$ where $s$ represents the table speed and the number of the stationary contacts engaged by the wiper 80$i$. The voltage across the resistor 135 is proportional to V$s$. But the voltage on the wiper 85e is proportional to V$sf$, where $f$ represents the saddle feed rate and the number of the stationary contact engaged by the wiper 85e. Thus, the voltage on the wiper 85e is directly related to the multiplication product of selected table speed $s$ and selected relative feed rate $f$, and is therefore directly related to the absolute feed rate or velocity at which the saddle 30 is moving. Furthermore, the voltage appearing on the wiper 85e is an A.C. voltage of one phase polarity or the other, depending upon whether the saddle is moving in a forward or reverse direction.

It is not essential that the voltage dividers 130 and 135 produce fractional voltages which are exactly proportional to the selected table speed and saddle feed rate. All that is required is that such voltages increase in steps as the table speed and saddle feed rate increase in steps. For optimum performance, however, the taps on the dividers 130 and 135 may be differentially spaced apart by distances which are determined by the sixteen table speed and sixteen feed rates listed by way of example in Tables I and II, supra.

To utilize this anticipation signal appearing on the wiper 85e, the latter is connected through normally closed relay contacts SD1 to anticipation input terminals AI in the medium and fine discriminators 95 and 96. Referring to FIG. 8, the anticipation signal appearing between the input terminals AI and the ground or reference terminal 105 is transferred through a potentiometer 138 and a resistor 139 to the control electrode 108a, of the amplifier 108. This application of the alternating voltage anticipation signal to the control electrode 108a, which also receives an error signal through the resistor 107, results in the algebraic subtraction of the anticipation signal from the error signal before amplification by the discharge device 108.

It will be recalled that the A.C. error signal appearing across the terminals 105, 106 is of one phase or the opposite phase relative to the A.C. source voltage appearing between the supply lines L3 and L2, depending upon whether the error is positive or negative in sense. If the error is positive or negative, then the direction of saddle movement as selected by the direction storage switch 84 (FIG. 5D) will be in a forward or reverse sense, respectively. Thus, the error signal is positive or negative in phase polarity when the saddle is moving in a forward or reverse direction. The relay contacts FR3 and FR4 are so arranged with reference to the center tapped secondary winding 131b that when the saddle is moving in a forward or reverse direction, the A.C. anticipation signal will be of negative or positive phase polarity. Because the discharge device 108 operates as an algebraic summing amplifier, and because the error signal and the anticipation signal applied to the control electrode 108a through the resistors 107 and 139, respectively, are always of opposite phase, the anticipation signal will be subtracted from the error signal, making the net control or effective control signal smaller than the error signal.

A null response, i.e., simultaneous deenerigzation of both relays PL and MI, will be produced by the discriminator before the true error signal is reduced to a sufficiently small magnitude to fall within the deadband of the discriminator. Thus, the discriminator is caused to "anticipate" the occurrence of a true null condition and to produce a first null response before the position error is reduced to zero, i.e., before the saddle 30 reaches the end-point position designated by the stored position information. Because the anticipation signal which is subtracted fom the true error signal to produce the net control signal appearing at the anode 108b is proportional in magnitude to the absolute velocity or feed rate of the saddle 30, this first null response of the discriminator will occur when the translatable element or the saddle 30 is displaced from the desired end-point position by a distance which is directly related, and preferably proportional to, the absolute velocity of the saddle 30.

Figure 5D:
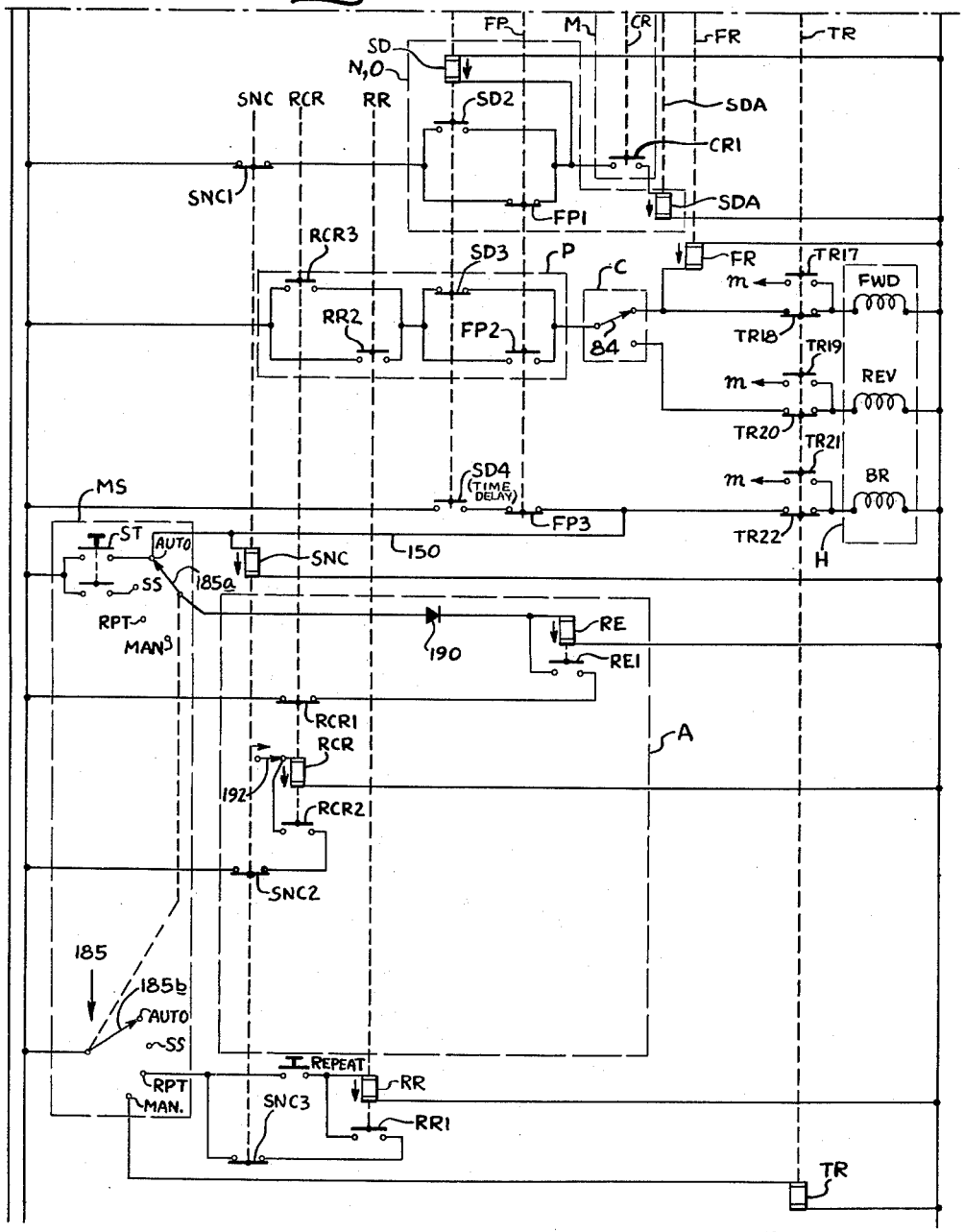

This anticipating response of the medium and fine discriminators 95 and 96 (FIG. 5B) occurs at a time when the coarse discriminator 94 is satisfied since the anticipation never will exceed the deadband of the coarse discriminator. When the two relays in both the medium discriminator 95 and the fine discriminator 96 are both de-energized, indicating an anticipation response, a circuit will be established by those relay contacts (FIG. 5C) to deenergize the final position relay FP. This results in closing of the previously opened relay contacts FP1 (FIG. 5D). Assuming contacts SNC1 to be closed, a slowdown relay SD is thus energized and sealed in through its own normally open contacts SD2. Moreover, assuming that normally open contacts CR1 have been closed, an auxiliary slowdown relay SDA will also be energized and sealed in by the contacts SD2. Energization of the relay SDA resets the feed transmission to cause the saddle 30 to be slowed from a running feed rate to a computed fine feed rate, in a manner which will be hereinafter described.

As soon as the relay SD is picked up and sealed in, its normally closed contacts SD1 (in series with the wiper 85e, FIG. 5B) open, thereby removing the anticipation signal from the discriminators 95 and 96. Thus, these discriminators now work not on a net control signal which is the algebraic difference between the true error signal and the anticipation signal, but rather upon the error signal alone. Accordingly, the medium and fine discriminators 95 and 96 will not be satisfied and the relay contacts therein will immediately cause the relay FP to be re-energized. While this causes the contacts FP1 to re-open, the relays SD and SDA remain energized. Even though the normally closed contacts SD3 are now open, the previously energized forward or reverse clutch coil FWD or REV remains energized because the contacts FP2 are closed. Motion of the saddle 30 continues at a fine feed rate until all of the discriminators are again satisfied, indicating that the saddle 30 has reached the desired end-point position. When the relay FP is de-energized a second time, its cotnacts FP2 open, thereby interrupting the energization circuit through the direction selector switch 84 to the forward or reverse clutch coils FWD or REV. Thus, the saddle 30 is stopped at the desired end-point position after having approached that position at a fine feed rate.

In this connection, it should be noted also that the brake coil BR is connected across the voltage supply lines L1, L2 through normally closed final positioning relay contacts FP3 and normally open slowdown relay contacts SD4. Thus, when the saddle is moving the contacts FP3 will be open and the brake coil BR deenergized to disengage the brake 71 (FIG. 3).

From the foregoing, it will be seen that the anticipation computer L receives as its input information indications of the table speed and saddle relative running feed rate, and operates to produce an A.C. anticipation signal directly related in amplitude to the absolute velocity or feed rate of the saddle and agreeable in phase polarity with the direction of saddle movement. This anticipation signal is supplied to the discriminators 95 and 96 where it is always subtracted from the error signal, thus producing anticipating responses by these discriminators which result in deenergization of the final positioning relay prior to the saddle actually reaching the desired end-point position. This first response or dropout of the relay FP is utilized to pick up and seal in slowdown relays SD and SDA, the latter serving (in a manner to be described) to make the feed transmission slow the saddle, and the former serving to disconnect the anticipation signal from the discriminators. When the anticipation signal is removed, the discriminators again energize the final positioning relay FP which causes the movement of the saddle to be continued until the end-point position is reached and the relay FP again deenergized. Upon this second deenergization of the relay FP, the particular one of the clutch coils FWD or REV which was energized is deactuated, and the brake coil BR is energized to bring the saddle to a quick stop at the desired end-point position.

FINE FEED COMPUTER AND CONTROLS

Because the feed transmission (FIG. 3) is driven from the table 21, the absolute running velocity or feed rate of the saddle 30 during any of successive machining steps depends not only upon the running feed selected by the setting of the switch 85, but also upon the table speed selected by the setting of the switch 80. If the feed transmission were always reset to a particular one of the sixteen possible relative feed rates to establish a fine feed prior to stopping of the saddle at each end-point position, the absolute value of the running feed rate would be dependent upon the particular speed at which the table is rotating. If the table speed were relatively high, the resulting absolute running feed rate might be so high as to permit overrunning of the saddle beyond the desired end-point position. If the table speed is very low, the absolute value of the fine feed rate might be so small as to require an inordinate amount of time for the saddle to travel the anticipated distance to the end-point position.

In accordance with one feature of the invention, provision is made to compute different values of relative fine feed rates which, on the basis of different selected table speeds, will result in an absolute fine feed velocity which is substantially independent of the table speed setting. This is the function of the fine feed computer R (FIG. 4).

As shown in more detail by FIG. 5B, the fine feed computer R receives an indication of the stored table speed represented by the angular setting of the shaft 81 of the switch 80. More specifically, the fine feed computer R includes the wipers 80e, 80f, 80g and 80h which are set to sixteen different angular positions according to the table speed stored for any machining step by the angular position of the shaft 81. Associated with each of these four wipers are sixteen stationary contacts, selected combinations of which are connected to the D.C. voltage supply line L1. Thus, depending upon the table speed represented by the angular setting of the shaft 81, a certain combination of the four wipers 80e–h will be placed at the potential of the supply line L1.

The wipers 80e–h are connected in circuit through normally open contacts SDA5–8, respectively, with the four feed clutch coils FC1–FC4. Therefore, when the auxiliary slowdown relay SDA is energized to open the contacts SDA1–4 and close the contacts SDA5–8, the four feed clutch coils FC1–4 will be energized in a particular combination which depends upon the table speed represented by the setting of the shaft 81. This combination of feed clutch coils FC1–4 which will be energized to produce a fine feed rate when the table 21 is operating at any of its sixteen speeds, is indicated in the following table:

TABLE III
(Fine feed computer)

| Table Speed | Relative Fine Feed | Absolute Fine Feed (inch/min.) | Energized Clutch Coils | | | |
|---|---|---|---|---|---|---|
| | | | FC1 | FC2 | FC3 | FC4 |
| 1 | 10 | .432 | x | | | x |
| 2 | 10 | .503 | x | | | x |
| 3 | 9 | .408 | | | | x |
| 4 | 9 | .480 | | | | x |
| 5 | 8 | .441 | x | x | x | |
| 6 | 8 | .503 | x | x | x | |
| 7 | 7 | .408 | | x | x | |
| 8 | 7 | .480 | | x | x | |
| 9 | 6 | .384 | x | | x | |
| 10 | 6 | .448 | x | | x | |
| 11 | 5 | .408 | | | x | |
| 12 | 5 | .480 | | | x | |
| 13 | 4 | .384 | x | x | | |
| 14 | 4 | .448 | x | x | | |
| 15 | 3 | .408 | | x | | |
| 16 | 3 | .480 | | x | | |

As shown in the foregoing tabulation, as the table speed is set to any of its sixteen possible values (see Table I), when slowing down action occurs due to pickup of the relay SDA, the particular connections to the stationary contacts associated with the wipers 80e–h (FIG. 5B) will produce different ones of the numbered relative fine feeds set forth in Table II. For example, it will be seen that if the No. 1 table speed is selected so that the wipers 80e–h are engaged with their No. 1 stationary contact, only the wipers 80e and 80h will be connected to the voltage supply line L1 and only the feed clutch coils FC1 and FC4 are energized by current flow through the closed contacts SDA5–8. This combination of energized feed clutches FC1 and FC4 produces the No. 10 relative fine feed rate having a value of 0.018 inch per table revolution (Table II). At the No. 1 table speed of 24 revolutions per minute (Table I), this produces an absolute fine feed rate for the saddle 30 of 0.432 inch per minute (Table III). Other combinations of feed clutches which are energized during fine feed operation will be apparent from Table III.

The absolute fine feed rates in any case are not materially varied from an average value of about 0.460 inch per minute. The figures given by Table III are, of course, merely exemplary. While the absolute fine feed rate imparted to the saddle 30 as it closely approaches a desired end-point position is not exactly the same for different table speeds, it does not depart appreciably from a predetermined value.

Through the provision of the fine feed computer R, therefore, the value of the absolute fine feed rate given to the saddle 30 as it closely approaches each desired end-point position is made substantially independent of the speed at which the table is rotating, thereby enhancing the accuracy with which end-point positioning is accomplished.

The apparatus for computing and effecting a fine feed rate for the saddle prior to its being stopped in a desired position, and the apparatus for "anticipating" stoppage of the saddle by initiating the fine feed when the saddle is displaced from the desired position by a distance proportional to its absolute velocity, have been described above in some detail. Nevertheless, it is believed that an even better understanding may be provided by a brief summary with reference to FIG. 9. This figure is diagrammatic in form and the connections and block representations therein are not intended to precisely correspond to the apparatus previously described in detail. However, insofar as it is feasible, like parts have been identified by the same reference characters in FIG. 9.

As represented in FIG. 9, the input reader A successively receives "blocks" of information, each designating (a) the selected one of the sixteen available rotational speeds at which the table 21 is to be driven, (b) the selected one of the sixteen available relative feed rates at which the saddle 30 is to be linearly translated, and (c) the end-point or stopping position for the saddle 30 at the termination of the corresponding step in the operation of the machine tool. Such information as to each "block" and each machining step is, of course, precalculated by a methods engineer or programmer. It may, in keeping with well known practices, be applied to a punched tape 200 or other suitable record which can be run through the reader A repeatedly to cause repetition of the over-all machining program. In other words, once the data for a complete machining program has been placed on a record or punched tape, any number of the finished parts which are defined by that program can be produced by reading the tape a corresponding number of times.

As each "block" of data or information is read, it is converted by the reader A into corresponding information signals which are supplied to and stored in suitable storage devices. The information designating the selected table speed is stored in a speed storage 80; information designating the selected feed rate for the saddle 30 is held by a feed storage 85; and information designating the desired end-point position for the saddle 30 is routed to and held by the desired end-point position storage E.

From the speed storage 80, information-bearing signals are passed over a channel 201 to the multi-ratio speed transmission G. This transmission is thus set to have a particular speed-change ratio which will cause the table 21 to be driven at the desired rotational speed from the motor 40 acting as a prime mover.

Information or signals indicative of the selected relative feed rate are passed from the feed storage 85 over a channel 202 and normally closed contacts 204 to the feed transmission I, the latter thus being set to provide a speed-change ratio which will cause the saddle to be translated at the selected relative feed rate. The output of the feed transmission I passes through a direction control and stopping means P (formed by forward and reverse clutches which can both be set in neutral to terminate feeding), and thence to the lead screw 36 which is cooperatively engaged by a nut 30a rigid with the saddle 30.

Information or signals indicative of the desired end-point or stopping position of the saddle 30 are passed from the end-point position storage E over a channel 205 to a position comparator, forming one input therefor. The other input of this comparator is derived by an actual position sensor which is connected to the lead screw 36. Whenever the desired end-point position held in the position storage E differs from the actual position, then an error signal is produced by the position comparator on a channel 206.

Thus, as soon as one block of information has been sensed by the reader A, the table 21 will be rotated at the selected speed, and a position error will exist so that the saddle 30 is linearly translated toward the desired end-point position, its relative feed rate of movement being determined by the feed transmission I which is set in accordance with the selected feed rate held in the feed storage 85.

As noted above, it is desirable in order to compensate for the momentum of the saddle 30 to reduce its velocity or rate of travel to a relatively low value before it reaches the position in which it is to be stopped, thereby avoiding or minimizing the possibility of overshoot and hunting. This "slow approach" velocity before stopping must be low enough to prevent overshoot, but not so low as to require an extended period of time for the saddle to reach the stopping position. Since, as previously indicated, the input of the saddle transmission I is determined by the output of the speed transmission G, the absolute velocity at which the saddle 30 moves during any machine step depends upon the product of the selected speed and selected relative feed.

In order to make the absolute velocity of the saddle 30 substantially constant during those periods when it is moving slowly or at a fine feed rate, the fine feed computer R is provided. This fine feed computer receives as its input over a channel 208 signals which are indicative of the selected table speed. The higher the selected table speed, the lower is the relative feed rate which the fine feed computer R designates as being required during the slow approach or fine feeding interval. The computer R produces on its output channel 207 an information signal which is indicative or determinative of the required relative feed rate during the slow approach of the saddle 30 to its stopping position. Whenever the saddle 30 closely approaches its stopping point, the position error signal appearing on the line 206 causes, in a manner to be summarized below, slowdown means N to be actuated. This opens the contacts 204 and closes a set of contacts 209, so that the feed transmission I is now set to a ratio determined by the output of the fine feed computer R rather than the ratio determined by the feed storage 85. Accordingly, the feed transmission causes the relative feed rate of the saddle 30 to be reduced, and specifically to be reduced to a value which is inversely related to the selected table speed, so that the absolute velocity of the saddle during this approach period is substantially constant.

As noted above, the absolute velocity of the saddle prior to slowdown during any matching step may have any one of a great number of values, depending upon the selected table speed and the selected relative feed rate of the saddle. In order to compensate for the momentum of the saddle 30 and to further avoid the possibility of overshooting the desired stopping position, the system here summarized causes the slowing down operation to be initiated when the saddle 30 is displaced from its desired end-point position by a distance which is directly related to the absolute velocity at which it is moving. For this purpose, the anticipation computer L receives over channels 210 and 211 information or signals which are respectively representative of the selected speed at which the table is rotating and the selected relative feed rate at which the saddle 30 is moving. The computer L, in effect, multiplies these two values and produces a signal proportional to their product, and which is thus proportional to the absolute velocity at which the saddle 30 is moving. This will be apparent when one considers that the dimensions of table speed are usually considered as revolutions per minute, and the dimensions of relative saddle feed rate are usually considered as inches per table revolution. Dimensionally multiplying revolutions per minute by inches per revolution produces a product representing absolute velocity, i.e., inches per minute.

The signal produced by the fine feed computer L is transferred over a channel 212 as one input to an algebraic subtractor K. The other input of this subtractor is the position error signal appearing on the line 206. With the auxiliary signal appearing on line 212 subtracted from the position error signal 206, a net control signal is produced by the subtractor K on its output line 214. This composite signal will be reduced to zero before the position error signal is reduced to zero. The composite signal is supplied to slow down means N which cause the contacts 204 and 209 to be respectively opened and closed whenever the composite signal is reduced to zero. This, as noted above, initiates the slowdown action. Because the auxiliary signal produced by the anticipation computer L is proportional in magnitude to the absolute velocity of the saddle 30 and is substracted from the position error signal to produce the composite signal or line 214, the slow down means will be actuated when the saddle is actually displaced from the desired stopping position by an amount which is directly related, or preferably proportional, to the absolute velocity at which the saddle is moving.

COMPARISON OF RUNNING AND FINE FEED RATES

In some instances when the selected running feed rate is very low, if the fine feed rate determined by the computer R were put into effect the saddle 30 would actually increase in velocity as it approached the desired end-point position. This is undesirable, especially where finishing cuts are being made on a workpiece.

To overcome this difficulty, the comparator-selector M (FIG. 4) senses the running feed rate from the feed rate storage D, senses the fine feed rate which would be produced by the fine feed computer R for the speed at which the table is operating, compares the two, and prevents down-shifting of the feed transmission if the computed fine feed is greater than the running feed.

As shown in more detail by FIG. 5C, the comparator-selector M senses the running feed rate during any machining step by means of a switch wiper 85f connected to the shaft 86 of the feed-setting switch 85. A voltage is produced on the wiper 85f which is directly related to the selected running feed rate (Table II). For this purpose, the sixteen stationary contacts associated with the wiper 85f are connected to taps spaced along a voltage divider here shown as a tapped resistor 155. The latter has its lower end (adjacent the tap connected to the sixteenth contact for the wiper 85f) connected to the voltage supply line L1, and its upper end connected to the voltage supply ine L2. Thus the D.C. voltage appearing between the wiper 85f and ground is directly related to the running feed rate which is selected by the position of the switch shaft 86 and determined by the energized combination of the feed rate clutches FC1–4.

In order to sense the value of the fine feed rate which would ordinarily be produced by the fine feed computer R during a slow approach toward an end-point position, the wiper 80j connected to the shaft 81 of the table speed-setting switch 80 is associated with sixteen stationary contacts. As the selected table speed is changed from the values 1–16 (Table I), the output of the line feed computer R will call for a relative fine feed which is progressively smaller (see Table III). That is, the relative fine feed decreases from setting No. 10 down to setting No. 3 as the table speed determined by the setting of the switch 80 is increased. Thus, as the wiper 80j is moved from its first toward its sixteenth stationary contact, the voltage thereon will be directly related to the fine feed rate called for by the fine feed computer R.

To derive a voltage which is proportional in magnitude to the fine feed rate called for by the computer R, the sixteen stationary contacts associated with wiper 80j are connected to spaced taps on a voltage divider here shown as a resistor 156. The upper end of this resistor (adjacent the tap connected to the first contact for the wiper 80j) is connected to the positive voltage supply line L1 and the lower end is connected to the voltage supply line L2. Therefore, as the switch wiper 80j moves from the first toward the sixteenth position, it will receive a progressivley decreasing positive voltage relative to ground and which is, therefore, directly related to the fine feed rate called for by the computer R.

Summarized, the wiper 80j always receives a D.C. potential which is related in magnitude to the fine feed rate which is scheduled to be imparted to the saddle 30 as the latter closely approaches an end-point position. The wiper 85f receives a D.C. potential which is directly related to the running feed rate imparted to the saddle 30 prior to slowing down. In order to detect and indicate whether the running feed rate is greater or less than the scheduled fine feed rate, the voltages appearing on the wipers 80j and 85f are compared by means of a unidirectionally conductive device or diode 158 connected in series with a comparison relay CR across the wipers 80j and 85f. The diode 158 is here shown as poled to conduct current only if the potential appearing on the wiper 85f exceeds the potential appearing on the wiper 80j. Therefore, the comparison relay will be energized only if the running feed rate exceeds the scheduled fine feed rate. If the comparison relay CR is energized, this means that shift-down to the scheduled fine feed rate should take place, and if the comparison relay CR is not energized this signifies that no shift-down to the scheduled fine feed rate should occur.

These objectives are here accomplished by the normally open contacts CR1 controlled by the comparison relay CR. As shown in FIG. 5D, the relay contacts CR1 will permit the auxiliary slowdown relay SDA to be energized at the same instant that the slowdown relay SD is energized only if the comparison relay CR is picked up. In this event, the contacts SDA1–8 (FIGS. 5A, B) will all be actuated so that the feed clutches FC1–4 will be placed under control of the fine feed computer R and down-shifting occurs within the feed transmission (FIG. 3) to produce the scheduled fine feed rate of movement for the saddle 30. On the other hand, if the comparison relay CR is deenergized, then when the anticipation response represented by the first deenergization of the final positioning relay FP occurs, the slowdown relay SD will be energized and the operation previously described in connection with the relay FP will occur. However, the slowdown relay SDA will not be energized so that the contacts SDA1–8 all remain in their original positions, and movement of the saddle 30 continues at the previously existing running feed rate until the end-point position is reached and the final position relay FP is deenergized a second time.

Thus, the feed transmission is made to shift to a new setting as the saddle 30 closely approaches each desired end-point position only if the new setting of the feed transmission will produce a slowing of the saddle 30 relative to the running feed rate at which it was previously moving.

The apparatus for preventing change-over to a scheduled fine feed rate if the saddle is already moving at a selected feed rate which is slower, has been described in some detail. However, it is believed that this concept, and the general organization of the system components for producing this effect, may be better understood through a brief summary with reference to FIG. 10. FIG. 10 is similar to FIG. 9, although the anticipation computer and associated parts have been omitted from FIG. 10. Instead, the apparatus for preventing operation of the slow down means have been illustrated in FIG. 10 in heavier lines in order to emphasize the differences between FIGS. 9 and 10.

Referring to FIG. 10, it will be seen that a comparator M has two inputs 215 and 216 which lead directly from the feed storage 85 and the fine feed computer R. Thus, the comparator M receives input information or signals which represent (a) the selected relative feed rate at which the saddle 30 is being moved and (b) the fine feed rate determined by the computer R and which is scheduled to occur when the saddle has closely approached the desired end-point or stopping position. The comparator M compares these two values and supplies a response only if the scheduled fine feed rate is greater than the existing selected feed rate. That response takes the form of opening of a set of normally closed contacts 218 which are interposed in a line 219 which normally transfers the error signal (or the composite signal described with reference to FIG. 9) to the slow down means N.

If the existing selected feed rate is greater than the scheduled fine feed rate determined by the computer R, the contacts 218 will remain closed and the slow-down means N will be actuated as the saddle approaches the desired stopping position. Accordingly, the contacts 204 and 209 will be respectively opened and closed, so that the feed transmission I is reset to cause the saddle to move at the slower fine feed rate until it reaches and is stopped at the end-point position. On the other hand, if the selected feed rate for the saddle 30 is less than the fine feed rate determined by the computer R, the comparator M will cause the contacts 213 to be opened, so that the slowdown means N are not actuated and the contacts 204 and 209 remain in the positions shown. Thus, slow down of the saddle 30 will not occur (because it is not necessary) and the saddle will continue to move at its previously selected feed rate until the error signal appearing on the line 206 is reduced to zero and the stopping means P are actuated to terminate drive of the lead screw 36.

As a result of this cooperative system of components, switch-over to a fine feed rate before stopping of the saddle is avoided in those instances where such switch-over would in fact result in speeding up of the saddle. Finishing cuts are thus accomplished at a uniform feed rate throughout. Yet, overshoot of the saddle beyond the desired stopping position is avoided because the saddle is moving at a slow enough velocity whenever the error signal goes to zero and drive to the saddle is terminated.

POSITION CORRECTION

In controlling a machine tool such as the vertical turret lathe 20 (FIG. 1) to repeatedly execute over-all machining operations made up of a plurality of successive machining steps designated from programmed information read from a digitally punched tape or the like, it is impossible in making up the instructions to be followed for each machining step to anticipate and account for a number of variable factors which may affect the dimensions of the finished workpieces. These factors include tool wear, tool deflection which varies with extension of the ram 31 relative to the saddle 30, the particular type of cutting tool placed by the turret in an operating position during any given step, different tool deflections with different depths of cut, etc. Moreover, if a given program of information for successive steps of operation is to be utilized by a number of similar machine tools of different makes and ages, the lead screw and gearing wear and backlash will be different for each such machine tool. The programmer cannot take this into account.

Simply positioning the saddle 30 or other movable machine tool elements to specified locations along their paths of movement will not assure that the cutting edge of a tool will so engage the workpiece on the table 21 that the workpiece is machined precisely to the desired dimension. Inaccuracies on the order of ±.010 inch are likely to occur due to these factors which cannot be taken into account during programming. Of course, certain end-point positions to which the saddle or other machine tool element may be moved are not critical and do not affect the dimensional accuracy of the workpiece. If the saddle is to simply back the cutter away from the workpiece before approaching it at a different level, the point at which the backing movement is terminated is not particularly critical.

In order to make it possible successfully to machine workpieces to a high degree of accuracy from a given program of instructions as to table speeds, feed directions, feed rates, and end-point positions for a series of machining steps, provision is here made to permit the operator of the machine tool to "dial in" a position correction which changes the final end-point position of the movable machine tool element slightly from that originally called for by the input data. The arrangement is such that an individual correction can be made in the end-point position for any number of critical machining steps, and the adjustment when once made for a given step will be taken into account as the same over-all machine operation is repeated a number of times.

In accomplishing the foregoing, a plurality of position adjustors or correction signal generators are utilized, and a particular one of such devices is brought into operative effect for a particular one of the steps of a machining operation by selection according to information included as a part of the instructions for that machining step. The data designating the particular adjustment device to be effective during a given machining step is stored by the selected adjustor storage F (FIG. 4) which, in turn, picks out one of a plurality of adjustors Q and makes the latter effective to supply a correction signal to the discriminators K. The correction signal is of a polarity and magnitude determined by the setting of the adjustor device. It is algebraically added to the error signal supplied to the discriminators, thus causing the latter to produce a null response and terminate movement of the translatable machine tool element, when the latter reaches some final position which is displaced the desired amount and direction from the end-point position designated by the data held in the end-position storage E.

An exemplary embodiment of such position correcting means is illustrated in part by FIG. 6. As there shown, a transformer 160 has its primary winding 160a connected across the A.C. voltage supply lines L3, L2, and its secondary winding 160b provided with a grounded center tap. The A.C. voltages appearing on the output leads 160c, 160d of the secondary winding 160b, are therefore, of like amplitude but of opposite phase polarity. To store information from the data reader A (FIG. 4) which designates a particular one of plural adjusting devices which is to be effective during a given machining step, a multi-point switch 165 (FIG. 6) is employed, having wipers 165a, 165b connected to a common shaft 166. That shaft and the associated wipers may be set to any of a plurality of angular positions so that the wipers engage any of a corresponding plurality of stationary contacts in response to data received from the reader A of FIG. 4.

For example, the switch 165 may be a stepping switch which is set to any of its possible positions in response to information read from a punched tape by the data input reader. Because this is a well known technique, the apparatus for setting the switch shaft 166 has not been shown.

The adjustment devices of correction signal generators have here been illustrated as a plurality of potentiometers P1, P2, P3, P4, P5 . . . Pn. The lower extrem'ties of these potentiometers are all connected to the lead 160d. The upper ends of these potentiometers are selectively connected, one at a time, to the output conductor 160c through the wiper 165a. As the shaft 166 is set to successive ones of its angular positions, the wiper 165a successively connects the lead 160c to the upper extremity of the potentiometers P1, P2, P3, P4, P5 . . . Pn. In this manner, the setting of the switch 165 is made to select, i.e., energize, a particular one of several available potentiometers.

To indicate which one of the potentiometers is effective at any instant to provide for adjustment in the end-point position of the saddle 30, each potentiometer has connected in parallel therewith a pilot lamp P1a, P2a, P3a, etc. Whenever any one of the potentiometers is selected and energized, the corresponding pilot lamp will be lighted to signify to the operator which potentiometer will cause a change in the final position to which the saddle 30 is moved.

Each of the potentiometers has a manually adjustable wiper P1b, P2b, P3b, P4b . . . Pnb. When the wiper of a selected potentiometer is at the midpoint position, it will receive zero voltage or ground potential inasmuch as the opposite ends of the potentiometer are connected across hte center tapped secondary winding 160b. If however, the wiper is moved in one direction or the other from the center position, it will receive a progressively higher amplitude A.C. voltage of one phase polarity or the other, i.e., either in phase with the supply voltage appearing across the lines L2, L3 or out-of-phase therewith.

In order to transfer this correction signal which appears on the wiper of the selected potentiometer, all of the wipers P1b–Pnb are connected to the respective stationary contacts associated with the switch wiper 165b. Thus, for example, if the switch wiper 165a is in its second position so as to energize the potentiometer P2 by connecting it across the secondary winding 160b, the switch wiper 165b will also be in its second position, thereby connecting the potentiometer wiper P2b to the switch wiper 165b.

The switch wiper 165b (FIG. 6) leads directly to two correction input terminals CI in the medium and fine resolvers 95, 96 (FIG. 5C). In order to understand how these correction signals effect changes in the final end-point position to which the saddle 30 is moved, reference should be had to FIG. 8. As there shown, the A.C. voltage correction signal (which is of an amplitude and phase polarity determined by the setting of the effective potentiometer wiper) appears between the input terminals CI and 105. A proportion of this correction signal is picked off by a potentiometer 170, and passed through a resistor 171 to the control electrode 108a of the summing amplifier 108. The correction signal constitutes in itself a relatively small amplitude "error" signal which is either positive or negative in sense. The principal error signal applied to the terminals 105, 106 is of a magnitude related to the discrepancy between the actual position of the saddle 30 and the desired position represented by the information in the programmed end-point storage means. This also may be positive or negative in sense, i.e., of one phase polarity or the other. The summing amplifier 108 operates to algebraically add the error signal appearing on the terminals 106, 105 and the correction signal appearing between the terminals CI, 105 (as well as the anticipation signal if it is then appearing between the terminals AI, 105). As a result of this algebraic addition, the amplified net control signal appearing at the anode 108b is greater or less than it would be if only the true error signal had been amplified, and by an amount which is determined by the setting of the wiper for the selected potentiometer or correction generator.

As the discriminator of FIG. 8 causes one or the other of the relays PL, MI to be energized and thereby effects movement of the saddle 30 toward the desired end-point position, the true error signal appearing between the terminals 106, 105 will be progressively decreased in amplitude. However, a null-response will occur only when the net control signal derived by algebraic addition of the true error signal and the correction signal has been reduced to less than a predetermined magnitude. Therefore, both relays PL, MI will be simultaneously deenergized to signify a null response when the saddle 30 has been moved not to the position designated by the stored end-point data, but to a position within the deadband which is centered about that end-point plus or minus a small incremental distance which is represented by the setting of the selected correction potentiometer.

As a matter of convenience, the manually adjustable potentiometer wipers P1b through Pnb (FIG. 6) may be associated with scales calibrated directly in thousandths of an inch to let the operator "dial in" to the desired position correction.

During an initial run from a given program of information, the saddle 30 can be stopped at the end of each positioning step. The dimension which will be machined on the workpiece with the saddle in that position can be measured after moving the ram vertically a slight amount under manual control to make a test cut. In the event that a dimensional inaccuracy exists, the operator can back the movable saddle 30 so that the cutter is withdrawn from the workpiece, and then make an appropriate adjustment in the setting of the selected potentiometer. The positioning step in then repeated, a second test cut made, and the workpiece again measured to see if the final position resulting from the programmed end-point, as modified by the corrective action of the adjusted potentiometer, does produce exactly the desired dimension on the workpiece.

This procedure can be repeated at the end of each of the critical positioning steps during the initial run or set-up operation. Once an initial run has been made and the potentiometers selected for certain ones of the steps adjusted to provide necessary positional corrections, those potentiometers are left in their settings. Then, when the over-all machining operation is repeated any number of times to produce a plurality of identical workpieces, each time that the control system receives input data for a given machining step, the selector switch 165 (FIG. 6) will be set to the same position, so that the same correction potentiometer will be placed in effective connection with the discriminators and the same modification or correction in the final end-point position achieved.

The apparatus for accomplishing the correction or adjustment of saddle positions relative to those which are programmed and designated by information fed to the reader A has been described in some detail above. Nevertheless, it is believed that a better understanding of the over-all relationships and cooperative operation of the system components in producing this advantageous result will be better understood through a brief summary with reference to FIG. 11. FIG. 11 is diagrammatic in form, and illustrates only those parts of the present system which are concerned with the position correction or adjustment feature.

Referring to FIG. 11, the input reader A receives successive sets or blocks of information from a suitable record such as the punched tape 200. As noted previously, each block or set of information may contain a designation of the selected lathe table speed, the selected relative feed rate for the saddle 30, and the desired end-point position. It is, as noted above, impossible for the programmer who makes up these sets of information in the first instance to foresee and provide for tool wear, tool deflection, or backlash and imperfections in the machine tool gearing and lead screws. Instead, the programmer may include in each block of information a selection code which will correspond to a particular one of several different adjustors or correction signal generators. As the reader A senses each block of information, therefore, it will not only transmit the desired position information to the position storage E, but it will also transmit any selection code to the selected correction device storage F.

Such selection codes are here identified in three successive blocks on the punched tape 200 as SC(P1), SC(P2), and SC(P3). In response to the receipt of these respective selection codes, the correction device storage F sets the movable wiper 165a of a stepping switch 165 to a corresponding contact point leading to rheostats P1, P2, or P3.

The rheostats are here shown as one form of adjustable signal sources or generators. It will be noted that all of these rheostats are connected across a voltage source, so that the voltage appearing on their wipers and transferred through the stepping switch 165 to an algebraic summing device K depends upon the position to which those potentiometer wipers are adjusted.

In operation, therefore, as each block of information is received, the programmed end-point position is transferred to the position storage E and the selection code is transferred to the storage F. Assuming that the selection code SC(P1) is read, the wiper 165a will take the position illustrated in FIG. 11, and the wiper of the potentiometer P1 will thus be connected to supply a correction signal as one input to the algebraic summing device K.

The position comparator shown in FIG. 11 receives as its first input signals from the position storage E which are indicative of the programmed end-point position; it receives as its second input from a position sensor information or signals which represent the actual position of the saddle 30. The output of the position comparator is a first or true error signal which is transferred as a second input to the algebraic summing device K. The output of the summing device appearing on a line 220 is thus a composite control signal which is the algebraic sum of the error signal and the correction signal picked off of the potentiometer P1. This composite or net control signal is supplied to drive means I, P which rotate the lead screw 36 to move the saddle 30 until it reaches a position at which the composite signal is reduced to zero. At this time, the true error signal produced by the position comparator may not be zero. Thus, the final position of the saddle 30 is not that which has been programmed or designated by the information originally fed to the reader A, but is a position which is displaced therefrom by a distance which depends upon the setting of the wiper of potentiometer P1, and thus the magnitude of the correction signal taken from that selected potentiometer.

The operator of the machine tool may adjust the wiper of the potentiometer P1 in order to change the final position of the saddle 30, and thereby compensate for tool wear, tool deflection or other factors which the programmer could not take into account.

When the next step of the over-all machining operation is effected by the reader A receiving the next block of information, a different one of the several potentiometers P1 through P5 may be selected due to a different selection code being included in that block of information. Thus, the corrective displacement of the machine tool will depend upon the adjustment of the wiper for that particular potentiometer.

Once the operator has put the machine tool through a complete cycle for machining a given workpiece, and has adjusted the different potentiometers to produce the precise positioning of the saddle 30 and cutter carried thereby during each step, the system may operate repeatedly to produce a large number of workpieces. The previously established corrective displacements for each step of the program are automatically accomplished because the same selection code will cause the wiper 165a to connect with the corresponding potentiometer during repetition of any given step.

This represents a very significant improvement and advantage in the automatic control of machine tools, and permits programmed data carried on a punched tape or other record to be used with a variety of different machines and under different conditions of tool wear and deflection.

OPERATION OF THE SYSTEM

It is believed that the operation of the system will be generally understood from the foregoing description of the results provided by the special control features. However, it will be helpful to review the operation in its entirety and with reference to means for effecting different modes of operation. These modes of operation are selectively obtained by setting a mode selector MS (FIG. 4) which is here illustrated (FIG. 5D) as a manually adjustable four-point switch 185 having ganged wipers 185a, 185b. Each of these wipers is adapted to simultaneously connect to stationary contacts which are here labeled "auto," "ss," "rpt" and "man" designating automatic, single cycle, repeat and manual modes of operation.

Portions of the data input reader A are shown in FIG. 5D. Since the reader, e.g., a punched tape reader, may be of well known organization, only certain components thereof are shown. These include a read relay RE which when energized causes the reader to begin reading a block of data for one step of machining operations, and a read-complete relay RCR which is energized to stop the reader after one each such block of data has been read.

With the foregoing in mind, let it be assumed that the mode selector switch 185 is in the "auto" position, that all relays in FIGS. 5A–D are deactuated, and that the data input reader A contains a punched tape or other record which has digital information thereon designating the table speed, saddle direction of motion, saddle running feed rate, saddle end-position, and a selected one of the correction or adjustor devices (where necessary) for each of the successive machining steps to be accomplished in a complete machining operation.

The operator initiates the action by momentarily depressing a start switch ST (FIG. 5D) so that the contacts thereof momentarily complete a circuit through a diode 190 and the coil of the read relay RE, which picks up and seals in through its own contacts RE1 and normally closed contacts RCR1. The reader thus begins reading information and successively supplies signals to set the switch 80 (FIG. 5A) to angular position representing the table speed for the first machining step; to set the switch 85 to a position representing the running feed rate for that machining step; to set the direction selector switch 84 (FIG. 5C) to that position corresponding to the direction of movement of the saddle 30, to set the end-position storage means E (FIGS. 4 and 7) to represent digitally the programmed end-point position for that step, and to set the storage switch 165 to that position which corresponds to a selected one of the correction potentiometers.

As switch 80 reaches the desired position, the wipers 80a–d energize the speed clutch coils S1–4 in a particular combination to drive the table 21 at the programmed speed. Moreover, as the switch 85 reaches the position corresponding to the programmed running feed rate the wipers 85a–d will complete circuits including the normally closed contacts SDA1–4 to energize a particular combination of the feed clutches FC1–4, so that when either the forward or reverse clutch coil FWD or REV is energized, the saddle 30 will be moved at the programmed relative feed rate. The direction selector switch will prepare a circuit either to the forward clutch coil FWD or the reverse clutch coil REV depending upon the programmed direction of movement. The end-point position storage means will supply appropriate signals in digital form to the digital-to-analog converters J1 (FIG. 7) so that the resolvers 90–92 will supply error signals to the discriminators 94–96, thereby causing the relay contacts associated therewith (FIG. 5B) to establish an energization circuit for the fine position relay FP. The latter will be picked up so that its contacts FP1 open, its contacts FP2 close and its contacts FP3 open. Finally, the switch 165 (FIG. 6) will energize the selected one of the correction generators or potentiometers from the transformer secondary winding 160b, causing the associated pilot lamp to be energized to signal to the operator which one of these potentiometers is effective. Moreover, the switch wiper 165b will connect the adjustable wiper of the selected potentiometer to the input terminal CI of the medium and fine discriminators 95, 96.

When the tape reader has read all of this information constituting one "block" corresponding to the first machining step, it will supply energization current (by means not shown) to a terminal 192 (FIGURE 5D) so as to energize the coil of the read-complete relay RCR. The latter will pick up and seal in through its own normally open contacts RCR2 and the normally closed contacts SNC2, also opening the contacts RCR1 to deenergize the relay RE and terminate the reading operation.

As soon as the relay RCR picks up, indicating that the first block of data has been completely read, its contacts RCR3 will close, thereby completing a circuit from the voltage supply line L1 through the normally closed contacts SD3, the direction selector switch 84 and either the normally closed contacts TR18 or TR20 to energize the forward or reverse clutch coil FWD or REV. Assuming that the switch 84 is in the position shown, the forward clutch coil FWD is energized.

Simultaneously, the forward relay FR (FIG. 5D) will be energized so that its contacts FR1 and FR2 (FIG. 5C) respectively close and open to connect the relay contacts of the discriminators in circuit with the final positioning relay FP. The latter will be energized because a positive error response is now being sensed by those discriminators. Moreover, the relay contacts FR3 and FR4 will respectively close and open so that the conductor 132A will be connected to the conductor 134, making the anticipation signal produced by the anticipation computer L of a phase polarity which is opposite to that of the error signals produced by the resolvers as the saddle 30 approaches the end-point position.

When the forward clutch coil FWD is energized, the clutch 68 establishes drive to the lead screw 36 (FIG. 3) for the saddle 30, so that the latter begins moving in a forward direction toward the desired end-point position. The error signal supplied by the resolver 90 to the coarse discriminator 94 will progressively decrease in amplitude until the coarse resolver 94 is satisfied and both of its relays are deenergized. At this time, however, the relay FP will remain energized by current flow from the voltage supply line L1 through contacts of the relays within the medium or fine discriminators 95, 96. The error signals supplied to these discriminators by the medium and fine resolvers 91 and 92 will be progressively diminishing in amplitude as the saddle 30 approaches the desired position.

When the saddle 30 reaches a position which is displaced from the end-point position by a distance which is substantially proportional to the absolute velocity at which the saddle is moving, then the coarse and fine discriminators 95 and 96 will produce a null response, even though the error signals received from their associated resolvers have not been reduced to null values. This is because the anticipation signal supplied from the anticipation computer L, as previously described, to the medium and fine discriminators subtracts from the true error signals, so that the relay FP is deenergized in anticipation of the saddle reaching the desired final position.

When the relay FP drops out, its contacts FP1 reclose, thereby creating an energization circuit through normally closed contacts SNC1 to pick up the slowdown relay SD. This latter relay seals in through its own contacts SD2 so that it will remain energized even though the contacts FP1 subsequently reopen.

Also, the contacts CR1 controlled by the comparison relay CR will be closed or open at this time, depending upon whether the running feed rate of the saddle is greater than the fine feed rate which is scheduled by the computer R to occur before the saddle reaches its final position. Assuming that contacts CR1 are closed by the comparison means M, then the relay SDA will also be energized and sealed in along with the relay SD.

When the relay SDA picks up, it opens the normally closed contacts SDA1–4 and closes the normally open contacts SDA5–8. Accordingly, the switch wipers 85a–d are removed from controlling relationship with the feed clutch coils FC1–4, and instead, the switch wipers 80e–h within the fine feed computer R are placed in circuit with those clutch coils to energize them in a particular combination, which, taking into account the speed at which the table 21 is rotating, will produce a predetermined absolute fine rate of saddle movement. Thus, the saddle continues to move toward the programmed end-point position but at a much slower rate so that it is not likely to overrun when the drive thereto is terminated.

As soon as the slowdown relay was energized, its normally closed contacts SD1 (FIG. 5B) opened, thereby disconnecting the anticipation signal supplied by the computer L from the discriminators 95 and 96. Since the net effective error signal is in this manner increased by removing the subtracted anticipation signal, these discriminators detect a position error and, in the present example, will have the relay PL therein energized.

Accordingly, final position relay FP will be reenergized so that its contacts FP2 close and its contacts FP3 reopen. This operation occurs so rapidly that, for practical purposes, the relay FP is reenergized almost at the same instant that the relay SD is energized. Accordingly, even though the contacts SD3 open, the contacts FP2 reclose so quickly that the forward coil FWD is held energized.

Moreover, when relay FP initially drops out to close its contacts FP3, the relay SD picks up so that the contacts SD4 close. But as soon as the relay SD picks up to close the contacts SD4, the relay FP is again energized to reopen the contacts FP3 thereby preventing energization of the brake coil BR. Thus, continuity of motion is achieved, although the saddle 30 is slowed to a fine feed rate.

As the saddle 30 approaches the end-point position, the error signals supplied by the resolvers 91 and 92 to the discriminators 95 and 96 will be further diminished in amplitude. When the algebraic sum of these error signals and the correction signals supplied from the selected one of the correction potentiometers diminishes to less than a predetermined magnitude, then both discriminators 94 and 95 will produce a null response and have both of the relays therein simultaneously deenergized. This will not necessarily occur when the saddle 30 is exactly at the position designated by the stored end-point position data, but on the contrary, may occur at some point displaced from that position depending upon the adjustment given to the wiper of the selected correction potentiometer.

In any event, as soon as both the medium and fine discriminators 95 and 96 produce a null response, the relay contacts PL2a, PL2b, MI2a, MI2b, PL3a, MI3a (FIG. 5C) therein will cause the final positioning relay FP to drop-out a second time. As a first result of this, the relay contacts FP2 open. Since the contacts SD3 are now open, the forward clutch coil FWD will be deenergized so that drive to the lead screw 36 (FIG. 3) is terminated. Moreover, the contacts FP3 will reclose, and since the contacts SD4 are at this instant closed, the brake coil BR will be energized to engage the brake 71 (FIG. 3) and bring the lead screw 36 and the saddle 30 to a quick stop.

When current flows through contacts SD4, FP3 to the brake coil BR, it also passes over a conductor 150 (FIG. 5C) to energize a relay SNC, pick-up of which signifies starting of the next cycle. The contacts SNC1 open to break the sealing circuit for the slowdown relays SD and SDA so that the latter drop out. The contacts SNC2 open, thereby dropping out the read complete relay RCR. Moreover, current flows from the conductor 150 through the mode selector switch wiper 185a (in the "auto" position) and the diode 190 to energize the read relay RE, which again picks up and seals in through its own contacts RE1. Thus, the reading device A is started to read another block of input data and to reset the various storage devices according to information designating the table speed, saddle direction of motion, saddle running feed rate, saddle end-position and the selected correction potentiometer for the next machining cycle or step. With this, the table speed storage switch 80, saddle direction switch 84, saddle feed rate storage switch 82, end-point position storage switches E, and selected adjustor storage switch 165 are all properly conditioned to carry out the next machining step. When all data for the next step has been received, the foregoing cycle of operations is repeated.

During each machining cycle or step, the table 21 will be rotated at the selected one of several possible speeds. The saddle 30 will be moved at the selected one of several possible relative running feed rates. An anticipation signal will be provided by the anticipation computer L to cause the discriminators 95 and 96 to produce anticipatory drop-out of the relay FP. This causes pick-up of the slowdown relays SD and SDA (providing the comparison means M signifies by pick-up of the relay CR that the computed fine feed rate is less than the running feed rate) so that the feed transmission clutch coils FC1–4 are energized in a different combination determined by the fine feed computer R. The feed transmission is downshifted to make the saddle 30 approach the final position at an absolute fine feed rate which is substantially independent of the table speed. The position correcting potentiometer which has been selected will produce a correction signal which is algebraically added to the position error signal. Thus, the discriminators produce a null response and cause stopping of the saddle precisely at a final position which is corrected (according to the setting of the selected correction potentiometer) from that end-point position represented by storage in the end-point storage means.

In order to establish initially the necessary settings of the various potentiometers which are selected by the programmed data for respective ones of the machining steps, it is desirable to be able to make the machine tool stop after each step of an initial run, and if necessary, to make a test cut on the workpiece so that the operator can measure and correct the dimension obtained. This is here made possible by the mode selector switch 185 when the wipers 185a, 185b are set to the "ss" or single cycle position. Under these circumstances when the start switch ST is momentarily depressed, the same operation previously described will take place during the first step of the programmed operation. However, after that step has been completed and the saddle 30 brought to a stop, the energization of the conductor 150 and the relay SNC cannot result in reenergization of the read relay RE. Accordingly, the machine operation ceases.

The mode selector switch is then set to place the wipers 185a, 185b in the "man" position, thereby energizing a transfer relay TR. With this, the speed clutch coils SC1-4, the feed clutch coils FC1-4, the forward, reverse and brake coils FWD, REV, BR will all be disconnected from the control circuitry of FIGS. 5A-C by opening of the normally closed contacts for the relay TR. At the same time, these speed clutch coils, feed clutch coils, forward, reverse, and brake coils, will all be connected by closure of normally opened transfer relay contacts to individual terminals here labeled $m$. These terminals lead to conventional manual control circuits of the type fully illustrated and described in the above-identified Hollis patent. Therefore, the operator may actuate the conventional controls of the vertical turret lathe 20 in order to make a test cut on the workpiece. The table 21 is then stopped.

The operator may then measure the dimension cut on the workpiece. If it is found to be inaccurate, he can make an appropriate adjustment of the wiper for the selected correction potentiometer, i.e., the one indicated by the particular one of the energized pilot lamps (FIG. 6).

Following such adjustment, the saddle 30 is moved under manual control to shift the cutter back away from the workpiece.

Next, the mode selector switch 185 is set to the repeat position "rpt," and a "repeat" push button switch depressed. This completes an energization circuit through the wiper 185b for a repeat relay RR, which picks up and seals in through its own contacts RR1. Normally open contacts RR2 will close to establish an energization circuit for the forward clutch coil FWD. Since the saddle has been backed away from the end-point position, the resolvers 90-92 will be supplying error signals to the discriminators 94-96 so that the previously executed step will be repeated utilizing the information previously stored. At the end of that step when the brake coil BR is energized and current is supplied over the conductor 150 to the relay SNC, the normally closed contacts SNC3 will momentarily open to deenergize the repeat relay RR.

The operator may thus back the cutter away from the work and repeat a given step as many times as may be desired, readjusting the selected potentiometer as may be necessary. When the precise dimension on the workpiece is obtained, the mode selector switch 185 is set to the single cycle position "s," and the start switch ST momentarily depressed. This makes the read relay RE pick up and seal in, so that the data input reader A reads the next block of information from the punched tape or other record. All of the storage means will therefore be reconditioned in accordance with information for the next step, and the cycle of operation previously described will be carried out to produce that step. When that second step is completed, however, the read relay RE will not be automatically reenergized because the wiper 185a in the "ss" position does not receive current from the conductor 150 at the end of the cycle. Therefore, the machine will stop at the end of the second step. The procedure described above of measuring the workpiece and setting the second selected correction potentiometer to correct for variable factors not taken into account by the stored end-position information can be repeated.

In this manner, all of the steps of the machining operation can be carried out one at a time and appropriate settings made for the different ones of the correction potentiometers which are rendered effective during different ones of those steps.

Once these settings for the correction potentiometers have been made during the initial run the mode selector switch MS may be placed in the "auto" position and the entire series of steps constituting a complete machining operation produced in succession with the previously established position corrections associated with each step automatically being taken into account. As many identical workpieces as may be desired can be produced by repeating the complete machining operation on each.

Figure 1:
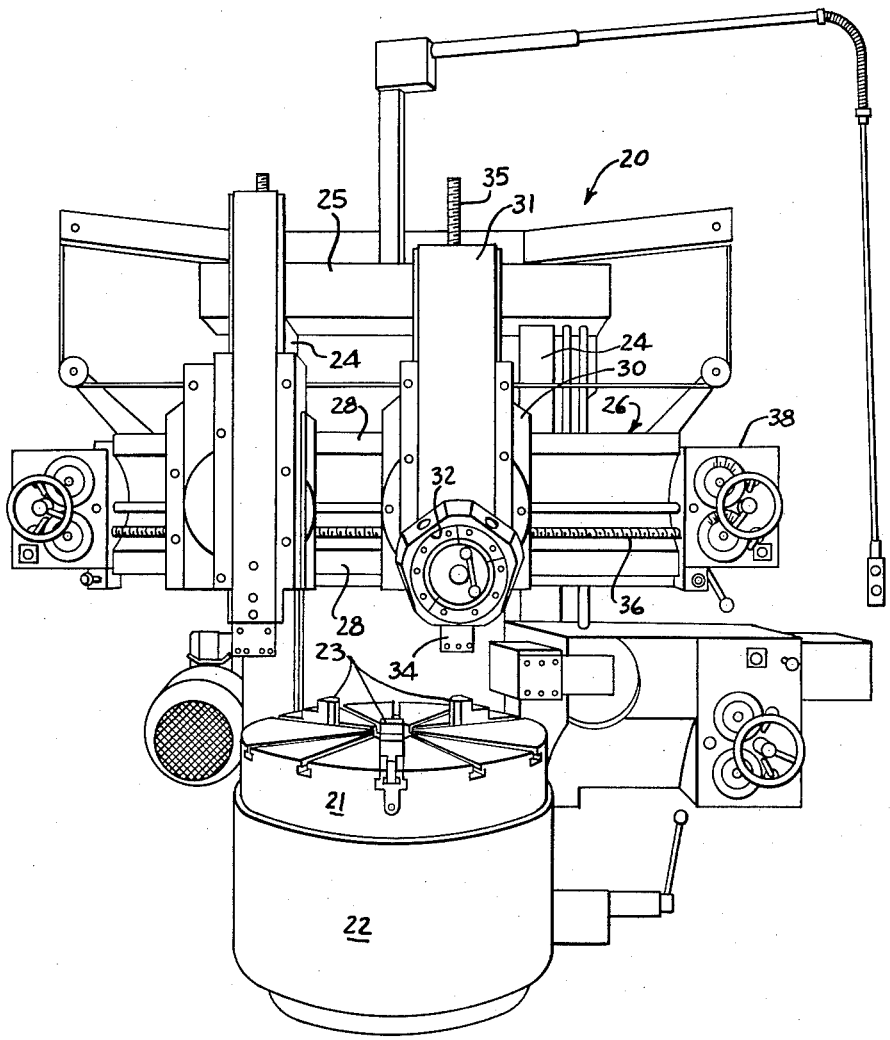
FIGURE 1 is a front elevation of an exemplary machine tool with which the invention is employed.

There has been provided an especially advantageous system for automatically controlling machine tools, such as the vertical turret lathe 20 of FIG. 1. Position corrections for each of a number of successive pre-programmed machining steps can be "dialed in" in order to compensate for variable factors such as tool wear or deflection under load which cannot be taken into account during programming. These position corrections are easily made by operating the control system in the single cycle, manual, and repeat modes during an initial setup run. Once those position corrections have been made, then the system may be operated in the automatic mode so that each of the steps are successively carried out.

During each such machining step provision is made to slow down the movable machine tool element or saddle 30 before it reaches a stopping position, the slowing down occurring when the saddle is displaced from the final stopping position by an amount which is related to the absolute feed rate or velocity of the element. Moreover, the setting of the feed transmission for the fine feed of the saddle 30 is automatically computed such that the relative fine feed rate produces an absolute fine feed rate which is substantially uniform regardless of the various speeds at which the table 21 may be rotating. Finally, provision is made to sense and compare running feed rates with scheduled fine feed rates, and to prevent down-shifting to the fine feed unless the scheduled fine feed rate is less than the running feed rate. By the features embodied in this system, therefore, a highly convenient, flexible, and precise control of machine tools is afforded.

I claim as my invention:

1. In a system for controlling the positioning of a translatable machine tool member, the combination comprising a machine tool having a rotatable element, selective speed means for driving said rotatable element at any one of a plurality of rotational speeds, a translatable member, selective feed means driven from said rotatable element and connected to translate said translatable member at any selected one of a plurality of relative feed rates, a computer, means conveying to said computer information indicative of the selected speed of said rotatable element, means included in said computer for determining a relative feed rate substantially inversely related to the selected speed of said rotatable element, and means for converting the setting of said selective feed means to that determined by said computer as said translatable member closely approaches an end-point position in which it is to be stopped, so that the absolute feed rate of said translatable member prior to stopping of the latter is approximately the same regardless of the selected speed of said rotatable element.

2. In a system for controlling the positioning of a translatable machine tool member, the combination comprising a machine tool having a rotatable element, selective speed means for driving said rotatable element at any one of a plurality of rotational speeds, a translatable member, selective feed means driven from said rotatable element and connected to translate said translatable member at any selected one of a plurality of relative feed rates, means responsive to programmed information for setting said speed means to produce a selected speed of said element, for setting said feed means to produce a selected relative feed of said member, and producing signals indicative of a desired stopping position of said member for each of a series of machining steps, means responsive to said signals for stopping said member in each desired position, a computer, means for conveying to said computer the selected speed setting of said selective speed means, means included in said computer for determining a relative feed rate for said element which is substantially inversely related to the setting of said selective speed means, and means for resetting said selective feed means to a different setting which produces the feed rate determined by said computer prior to said translatable element reaching each of its stopping positions.

3. In a control system for a machine tool having a rotatable member, a relatively translatable element, a multi-ratio transmission for driving the member at any one of a plurality of speed, and a multi-ratio transmission for driving from the member the translatable element at any one of a plurality of relative feeds, the combination comprising means for successively setting the speed transmission and the feed transmission to provide the desired speed and running feed for successive machining steps, means for successively storing information indicative of the end-point positions of the element for successive machining steps, means for providing a slowdown signal when the element approaches within a predetermined distance of each end-position, means for sensing the setting of the speed transmission, and means controlled by said sensing means and responsive to said slowdown signal for resetting said feed transmission to effect a fine feed rate which is inversely related to the speed of said rotatable element and of substantially the same absolute value regardless of the setting of said feed transmission.

4. In a system for controlling a machine tool having a rotatable table and tool-carrying element translatable relative thereto, the combination comprising a multi-ratio speed transmission having a plurality of clutches controlled by respective speed clutch coils which when energized in different combinations effect rotation of the table at different speeds, a multi-ratio feed transmission having its input driven from the table and its output connected to translate the element and further having a plurality of clutches controlled by respective feed clutch coils which when energized in different combinations effect movement of the element at different relative feeds, means for selectively energizing said speed clutch coils in different combinations for successive machining steps, means for selectively energizing said feed clutch coils in different combinations for successive machining steps, means for providing a slowdown signal when the element closely approaches its end-position for successive machining steps, means for sensing the combination of energized speed clutch coils, computer means responsive to said sensing means for determining the combination of said feed clutch coils to be energized to produce a relative fine feed rate inversely related to the table speed and of generally uniform absolute value, and means responsive to said slowdown signal for energizing said feed clutch coils in the combination determined by said computer means.

5. In a system for controlling a machine tool having a rotatable table and an element translatable relative thereto, the combination comprising means including a plurality of electrical components for driving said table at any of a plurality of speeds according to the combination of such components which are energized, means including a plurality of electrical devices for moving said element at any one of a plurality of relative feed rates according to the combination of such devices which are energized, a plural-position switch adapted to be set to different positions to represent different table speeds, means including first parts of said switch for energizing said electrical components in different combinations to produce the different selected speeds represented by the position of the switch, first circuit means for selectively energizing different combinations of said electrical devices to impart different relative running feed rates to said element, second circuit means including second parts of said switch for selectively energizing said electrical devices in different combinations according to the position of said switch to impart different relative fine feed rates to said element which are substantially inversely related to the selected table speed represented by the position of the switch, and means for transferring operative connection to said components from said first circuit means to said second circuit means.

6. The combination set forth in claim 1 further characterized by comparing means, means for conveying to said comparing means information indicating the relative feed rate at which said translatable member is moving before it closely approaches an end-point position in which it is to be stopped, means for conveying to said comparing means the relative feed rate determined by said computer, and means controlled by said comparing means for preventing the operation of said converting means if the said moving feed rate of said member is less than the said computer-determined feed rate.

7. The combination set forth in claim 2 further characterized by comparing means, means for conveying to said comparing means information indicative of the selected setting of said selective feed means, means for conveying to said comparing means information indicative of the setting of said selective feed means determined by said computer, and means controlled by said comparing means for preventing operation of said resetting means when the setting of said selective means produces a slower feed than that which would be obtained from said computer-determined setting.

8. The combination set forth in claim 3 further characterized by means for sensing the running setting of the feed transmission, means for comparing the sensed running setting of the feed transmission with the setting to be produced to effect the fine feed rate, and means controlled by said comparing means for preventing the resetting of the feed transmission to effect the fine feed rate if the latter is greater than the running feed rate.

9. The combination set forth in claim 4 further characterized by means for sensing the energized running feed combination of said feed clutch coils, means associated with said running feed sensing means and said fine feed rate computer means for comparing the running feed with the scheduled fine feed rate, and means controlled by said comparing means for preventing any response to said slowdown signal if the fine feed rate is not less than the running feed rate.

10 In a system for controlling the positioning of a translatable machine tool member, the combination comprising a translatable member, selective feed means for moving said member at any one of a plurality of running feed rates toward end-point stopping positions, means acting on said selective feed means for changing the feed rate of said member to a low value when said member closely approaches a stopping position, comparing means, means for conveying to said comparing means (a) information indicative of the selected running feed rate and (b) information indicative of the low value feed rate which would normally obtain from operation of said changing means, and means controlled by said comparing means for preventing operation of said changing means if the selected running feed rate is less than the low value feed rate.

11. In a system for controlling a machine tool having a translatable element and a multi-speed transmission for moving the latter at any of a plurality of feed rates, the combination comprising means for setting said transmission successively to drive the element toward successive end-point positions at different running feed rates, means responsive to the element closely approaching an end-point position for shifting said transmission to effect movement of the element at a fine feed rate, means for storing information indicative of the running feed rate and the fine feed rate, means for comparing such stored information, and means for preventing said shifting of said transmission if said comparing means detects that the running feed rate is less than the fine feed rate.

12. In a system for controlling a machine tool having a rotatable member and a translatable element, the combination comprising first means including a first positionable part for driving said member at any selected one of a plurality of speeds according to the setting of that part, second means including a second positionable part for driving said element at any selected one of a plurality of relative running feed rates according to the setting of that part, third means including said first positionable part for driving said element at any of a plurality of relative fine feed rates which are inversely related to the speed represented by the position of said first part, means for transferring control of the feed rate from said second means to said third means as said element approaches an end-point position, a first voltage divider having a movable connector associated therewith and positioned by said first part to provide a first voltage directly related to the scheduled fine feed rate represented by the position of said first part, a second voltage divider having a movable connector associated therewith and positioned by said second part to provide a second voltage directly related to the running feed rate represented by the position of said second part, and means for disabling said transferring means unless said second voltage is greater than said first voltage.

13. In a system for controlling the positioning of a translatable machine tool member during successive machining steps, the combination comprising a member translatable along a path, selective feed means for driving said member along said path at any one of a plurality of feed rates, means for creating successive signals for the successive machining steps and which are indicative of (a) the desired feed rate of said member and (b) a desired end-point stopping position of said member at any location along said path, means responsive to said desired feed rate signals for setting said selective feed means to move said member at the desired feed rate, means responsive to said desired stopping position signals for modifying the setting of said selective feed means to slow down said member prior to its reaching each desired stopping position, means responsive to said desired feed rate signals for initiating operation of said modifying means to slow down said member when the latter is displaced from the desired stopping position by a distance which is substantially proportional to the selected feed rate to compensate for the momentum of said member, and means responsive to said stopping position signals for interrupting the drive of said member when it reaches the desired stopping position.

14. In a system for controlling the positioning of a translatable machine tool member during successive machining steps, the combination comprising a translatable member, selective feed means for moving said translatable member at any one of a plurality of feed rates, means for creating signals indicative of a desired stopping position of said members, means responsive to said signals and to the actual position of said member for generating an error signal representing the position error, means responsive to said error signal for causing said selective feed means to move said member toward the desired stopping position at a selected feed rate, means responsive to the setting of said selective feed means for reducing said error signal by an amount substantially proportional to the selected feed rate at which said member is moved, and means responsive to the reduced error signal reaching zero for slowing said member from the selected feed rate to a lower feed rate.

15. In a system for controlling a machine tool having a translatable element and transmission means for moving the element at any of a plurality of absolute feed rates, the combination comprising means for creating a signal representing a desired end-point position, means responsive to the desired position signal and the actual position of said element for creating an error signal representing the difference between the desired end-point position and the actual position of the element, means for setting the transmission means to provide a selected absolute running feed rate; means for creating an anticipation signal directly related in magnitude to the selected absolute running feed rate, means for subtracting the anticipation signal from the error signal to create a net control signal, means for driving the element toward the desired end-point position at the selected running feed rate until the net control signal is reduced to a null value, means responsive to the net control signal reaching a null value for resetting said transmission means to provide a lower, fine feed rate, and means for thereafter driving said element at said fine feed rate until said error signal is reduced to a null value.

16. In a system for controlling a machine tool having a translatable element movable at any of a plurality of absolute feed rates, the combination comprising means for electrically representing a plurality of successive end-point positions to which the element is to be moved in successive machining steps, means for selecting different ones of said absolute feed rates at which said element is to be moved toward the end-point positions during successive steps, means for generating an error signal related in magnitude and sense to the difference between the actual position of the element and the electrically represented end-point position, servo means responsive to an input signal for effecting movement of the element toward each end-point position at the selected absolute feed rate, means responsive to said selecting means for creating an anticipation signal directly related in magnitude to the selected absolute running feed rate, means for subtracting said anticipation signal from said error signal to form a net control signal, means for supplying said net control signal as the input to said servo means, means responsive to the net control signal reaching a null value for causing said element to be moved at a fine feed rate, means responsive to the net control signal reaching a null value for removing said anticipation signal and supplying only said error signal as the input to said servo means, and means for stopping movement of the element when said error signal is reduced to a null value.

17. In a system for controlling a machine tool having a rotatable member and a translatable element movable relative thereto, the combination comprising means for driving said member at any selected one of a plurality of speed, means for moving said element at any selected one of a plurality of relative feed rates, means for sensing the values of the selected speed and selected relative feed rate and producing a signal related to the product of such values, and means responsive to said signal for resetting said element-moving means to produce a fine feed rate, slower than the selected feed rate, at an instant when the element is displaced from an end-point position by a distance substantially proportional to said signal.

18. In a system for controlling a machine tool having a rotatable member and a relatively translatable element, a speed transmission for driving the member at any of a plurality of rotational speeds, and a feed transmission having its input connected to the member for driving the translatable element at any of a plurality of relative feed rates, the combination comprising means for creating an electrical signal representing a desired end-point position of the element, first means for setting the speed transmission to drive said member at a selected one of the speeds, second means for setting the feed transmission to drive said element a selected one of the relative feed rates, means controlled by said first and second means to produce first and second signals respectively related in magnitude to the selected speed and the selected relative feed rate, means for multiplying said first and second signals to form an anticipation signal, means responsive to said end-point position-representing signal and to the actual position of said translatable element for creating a position error signal, means for subtracting the anticipation from the position error signal to produce a net signal, means for causing the element to move toward the desired end-point position at the selected running feed rate, and means for resetting the feed transmission to move the element toward the end-point position at a fine feed rate, slower than the selected feed rate, when said net signal is reduced to a null value, whereby the slowdown from the selected to the fine feed rate occurs when the element is displaced from the end-point position by a distance generally proportional to the absolute running velocity of the element.

19. In a system for controlling a machine tool having a rotatable member and a translatable element, speed control means for driving the member at any of a plurality of speeds, and feed control means driven from the member for moving the element at any of a plurality of relative feed rates, the combination comprising means for setting the speed control means to provide a selected speed for the member, means for setting the feed control means to provide a selected relative running feed rate at which the element is translated toward an end-point position, means for producing a first signal directly related to the selected speed, means for producing a second signal directly related to the selected relative running feed rate, means for producing a third signal substantially proportional to the product of said first and second signals, and means responsive to said third signal for resetting the feed control means to move the element at a fine feed rate when the latter is displaced from the end-point position by a distance directly related to the absolute running feed rate.

20. In a system for controlling a machine tool having a rotatable member and a translatable element together with speed control means for driving the member at any of a pluraltiy of rotational speeds and feed control means for driving the element at any of a plurality of relative feed rates, the combination comprising a first control having a first positionable part and means for setting said speed control means to produce a selected speed of said member determined by the position of such part, a second control having a second positionable part and means for setting said feed control means to produce a selected relative feed rate determined by the position of such part, first and second voltage dividers, means for energizing one of the dividers from a voltage source, contact means movable with said first and second positionable parts for connecting to successively spaced points along said first and second dividers, and means for energizing the other of said dividers from the contact means of the said one divider, whereby the output voltage on the contact means of the said other divider is related in magnitude to the absolute feed rate of the element for different selected speeds of said rotatable member and relative feed rates of said translatable element.

References Cited in the file of this patent
UNITED STATES PATENTS

| | | |
|---|---|---|
| 1,381,752 | Scheyer | June 14, 1921 |
| 2,831,387 | Ovshinsky | Apr. 22, 1958 |
| 2,869,390 | Leifer | Jan. 20, 1959 |

FOREIGN PATENTS

| | | |
|---|---|---|
| 793,473 | Great Britain | Apr. 16, 1958 |

OTHER REFERENCES

Publication: "Proceedings of the I.R.E. Australia," dated April 1958, article on "Numerically Controlled Machine Tools," by O. S. Puckle, p. 159, section 6–6.1.